United States Patent
Hoshino et al.

(10) Patent No.: US 9,279,045 B2
(45) Date of Patent: *Mar. 8, 2016

(54) TIRE PREPARED BY USING RUBBER COMPOSITION CONTAINING MODIFIED POLYMER

(75) Inventors: Yuuta Hoshino, Kodaira (JP); Noriko Mori, Kodaira (JP); Ken Tanaka, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 12/990,382

(22) PCT Filed: Apr. 30, 2009

(86) PCT No.: PCT/JP2009/058506
§ 371 (c)(1),
(2), (4) Date: Oct. 29, 2010

(87) PCT Pub. No.: WO2009/133936
PCT Pub. Date: Nov. 5, 2009

(65) Prior Publication Data
US 2011/0046263 A1   Feb. 24, 2011

(30) Foreign Application Priority Data
Apr. 30, 2008   (JP) .................. 2008-118321

(51) Int. Cl.
| | |
|---|---|
| *C08J 5/14* | (2006.01) |
| *C08L 15/00* | (2006.01) |
| *B60C 1/00* | (2006.01) |
| *C08F 36/06* | (2006.01) |
| *C08K 3/36* | (2006.01) |
| C08C 19/44 | (2006.01) |
| C08L 7/00 | (2006.01) |
| C08L 9/00 | (2006.01) |

(52) U.S. Cl.
CPC . *C08L 15/00* (2013.01); *B60C 1/00* (2013.01); *B60C 1/0016* (2013.04); *C08F 36/06* (2013.01); *C08K 3/36* (2013.01); *C08C 19/44* (2013.01); *C08L 7/00* (2013.01); *C08L 9/00* (2013.01)

(58) Field of Classification Search
USPC ........................................ 524/575
See application file for complete search history.

(56) References Cited

U.S. PATENT DOCUMENTS

| | | | | |
|---|---|---|---|---|
| 4,957,976 | A | * | 9/1990 | Takao et al. ............. 525/340 |
| 5,496,883 | A | * | 3/1996 | Hamada ................. 524/492 |
| 6,022,923 | A | | 2/2000 | Araki et al. |
| 6,191,205 | B1 | * | 2/2001 | Micouin et al. ......... 524/492 |
| 7,250,463 | B2 | | 7/2007 | Durel et al. |
| 7,683,151 | B2 | | 3/2010 | Endou et al. |
| 7,781,533 | B2 | | 8/2010 | Ozawa et al. |
| 2005/0004297 | A1 | * | 1/2005 | Durel et al. ............ 524/493 |
| 2005/0070672 | A1 | * | 3/2005 | Ozawa et al. .......... 525/331.9 |
| 2005/0159554 | A1 | | 7/2005 | Endou et al. |
| 2007/0299203 | A1 | * | 12/2007 | Panz et al. ............. 524/588 |

FOREIGN PATENT DOCUMENTS

| | | |
|---|---|---|
| CN | 1541245 A | 10/2004 |
| CN | 1592760 A | 3/2005 |
| EP | 0 638 610 B1 | 9/1997 |
| JP | 3-252431 | 11/1991 |
| JP | 06-157825 | 6/1994 |
| JP | 6-53763 | 7/1994 |
| JP | 6-57767 | 8/1994 |
| JP | 06-248116 | 9/1994 |
| JP | 7-70369 | 3/1995 |
| JP | 8-245838 | 9/1996 |
| JP | 11-124474 A | 5/1999 |
| JP | 2005-500420 A | 1/2005 |
| JP | 2006-037046 | 2/2006 |
| JP | 2007-138069 A | 6/2007 |
| JP | 2008-001743 A | 1/2008 |
| JP | 2008044992 A | 2/2008 |
| WO | 03/046020 A1 | 6/2003 |
| WO | 03/087171 A1 | 10/2003 |

* cited by examiner

*Primary Examiner* — Mark Eashoo
*Assistant Examiner* — Chelsea M Christensen
(74) *Attorney, Agent, or Firm* — Sughrue Mion, PLLC

(57) ABSTRACT

A tire prepared by using a rubber composition compounded with a modified conjugated diene base polymer obtained by reacting an active site of a conjugated diene base polymer with a hydrocarbyloxysilane compound which may have a functional group to introduce a functional group having high affinity with precipitated silica and precipitated silica in which a cetyltrimethylammonium bromide-adsorbing specific surface area (CTAB) (m²/g) and the mode $A_{ac}$ in diameters (nm) of primary aggregates determined by acoustic measurement of particle size distribution satisfy equation (A) shown below:

$$A_{ac} \geq -0.76 \times (CTAB) + 274 \quad (A).$$

11 Claims, No Drawings

TIRE PREPARED BY USING RUBBER COMPOSITION CONTAINING MODIFIED POLYMER

CROSS REFERENCE TO RELATED APPLICATIONS

This application is a National Stage of International Application No. PCT/JP2009/058506, filed on Apr. 30, 2009, which claims priority from Japanese Patent Application No. 2008-118321, filed on Apr. 30, 2008, the contents of all of which are incorporated herein by reference in their entirety.

TECHNICAL FIELD

The present invention relates to a rubber composition suitable as a member for tires and the like, more specifically to a tire prepared by using a rubber composition which is prepared by using precipitated silica having a specific structure as a reinforcing filler and can improve dispersibility of the filler and which is excellent in a low build-up, a fracture characteristic and abrasion resistance and contains a modified conjugated diene base polymer.

BACKGROUND ART

In recent years, requirement for low fuel consumption is becoming severer in connection with a movement of global emission control of carbon dioxide which follows social requirement for energy saving and a rise in concern about environmental problems. In order to meet the above requirement, tires which are reduced in rolling resistance and have a low heat build-up as a tire performance have come to be demanded. While a method for optimizing a tire structure has so far been studied as a method for reducing rolling resistance of a tire, it is carried out as the most usual method to use a material exhibiting a lower heat build-up as a rubber composition.

It has so far been carried out as a method for obtaining the above rubber composition having a low heat build-up to improve reinforcing fillers and rubber components.

Carbon black has so far been used as a reinforcing filler for rubber. This is because carbon black can provide rubber compositions with high abrasion resistance. When a low heat build-up is to be achieved by using carbon black alone, it is considered that a compounding amount of carbon black is reduced or that carbon black having a large particle diameter is used, but in both cases, it is known that abrasion resistance and grip on a wet road are not prevented from being reduced. On the other hand, it is known to use silica as a filler in order to enhance a low heat build-up (for example, patent documents 1 to 4). However, particles of silica tend to be aggregated by virtue of a hydrogen bond of a silanol group which is a surface functional group of silica, and silica is inferior in wettability with rubber molecules, so that dispersion of silica into rubber is not good. The kneading time has to be extended in order to improve the above problem. Also, if silica is insufficiently dispersed into rubber, a rubber composition is elevated in a Mooney viscosity and inferior in processability such as extrusion. Further, since a surface of a silica particle is acidic, silica adsorbs a basic substance used as a vulcanization accelerator in vulcanizing a rubber composition to prevent the rubber composition from being sufficiently vulcanized, so that the defect that the elastic modulus is not enhanced has been involved therein.

A silane coupling agent has been developed in order to improve the above defects, but dispersion of silica has not yet reached a sufficiently high level, and particularly it has been difficult to obtain industrially good dispersion of silica particles. Accordingly, it is tried to mix silica treated a surface thereof with a hydrophobicity-providing agent to accelerate reaction of a silane coupling agent (patent document 5).

Further, it is disclosed in a patent document 6 to use hydrophobic precipitated silica. However, since precipitated silica subjected to complete hydrophobicity treatment is used, surface silanol groups to react with a silane coupling agent disappear, and therefore the defect that rubber is not sufficiently reinforced has been involved therein. Further, silica having an increased particle diameter is used in order to improve a low heat build-up, but in that case, silica is reduced in a specific surface area by increasing a particle diameter to deteriorate a reinforcing property thereof. It is disclosed in patent document 7 to use silica having a specific form, but a low heat build-up and abrasion resistance of the rubber composition are not sufficiently high.

On the other hand, many modified rubbers interacting with fillers such as silica, carbon black have been developed as methods for improving rubber components. Among them, particularly a method in which a polymerization-active end of a conjugated diene base polymer obtained by anionic polymerization using an organolithium compound is modified with an alkoxysilane derivative having a functional group interacting with fillers is proposed as the effective method (for example, patent documents 8 and 9).

However, many of them are applied to polymers in which a living property of a polymer end can readily be secured, and methods in which a modification effect in a rubber composition compounded with silica and carbon black is sufficiently exerted are not necessarily obtained. Also, in many of conventional modifying methods, principal chains can not sufficiently be provided with branches, and therefore they have involved therein the problems that cold flow is a large obstacle when they are put into actual use and that when partial coupling is carried out in order to deal with the obstacle, the modification effect is inevitably reduced.

Accordingly, a method in which a condensation accelerating agent is added to a reaction system in order to further enhance a modification effect in modifying an active end of a conjugated diene base polymer with an alkoxysilane is proposed (for example, patent document 10). In the rubber composition, a low loss effect thereof to silica base fillers is enhanced to a large extent, but the low loss effect to carbon black is not necessarily satisfactory.

PRIOR ART DOCUMENT

Patent Document

Patent document 1: Japanese Patent Application Laid-Open Hei 6 No. 248116
Patent document 2: Japanese Patent Application Laid-Open Hei 7 No. 70369
Patent document 3: Japanese Patent Application Laid-Open Hei 8 No. 245838
Patent document 4: Japanese Patent Application Laid-Open Hei 3 No. 252431
Patent document 5: Japanese Patent Application Laid-Open Hei 6 No. 248116
Patent document 6: Japanese Patent Application Laid-Open Hei 6 No. 157825
Patent document 7: Japanese Patent Application Laid-Open No. 2006-37046
Patent document 8: Japanese Patent Publication Hei 6 No. 53763

Patent document 9: Japanese Patent Publication Hei 6 No. 57767
Patent document 10: WO03/087171 pamphlet

DISCLOSURE OF THE INVENTION

Problems to be Solved by the Invention

The present invention has been made in light of the existing situations described above and provides a tire prepared by using a rubber composition in which a reinforcing filler is excellent in dispersibility into a rubber component and which has small rolling resistance and is excellent in a low heat build-up, abrasion resistance and a fracture characteristic.

Means for Solving the Problems

The present invention intends to improve both of a rubber component and a reinforcing filler to improve dispersibility of the reinforcing filler into the rubber component, and it relates to a tire prepared by using a rubber composition using as a rubber component, a modified conjugated diene base polymer in which a functional group having high affinity with silica is introduced into an active site in a molecule and using precipitated silica having a specific structure as a filler.

The modified conjugated diene base polymer of the present invention is a modified polymer obtained by reacting a conjugated diene base polymer having an active site with a hydrocarbyloxysilane compound which may have a functional group to introduce the functional group into the active site, and further, it is a modified polymer obtained by carrying out condensation reaction in which the functional group described above participates in the presence of a condensation accelerating agent comprising a compound of an element belonging to at least one of 4th group, 12th group, 13th group, 14th group and 15th group in the periodic table.

On the other hand, the precipitated silica used in the present invention is characterized by having a structure (primary aggregation) which can be shown by an index shown below while precipitated silica usually aggregates (secondary aggregation) by a hydrogen bond between silanol groups present on a surface of the particles.

That is, a cetyltrimethylammonium bromide-adsorbing specific surface area (CTAB) (m$^2$/g) and the mode $A_{ac}$ in diameters (nm) of primary aggregates determined by acoustic measurement of particle size distribution satisfy equation (A) shown below:

$$A_{ac} \geq -0.76 \times (CTAB) + 274 \quad (A)$$

and an ignition loss (mass reduction % when heated at 750° C. for 3 hours) and a heating loss (mass reduction % when heated at 105° C. for 2 hours) satisfy preferably equation (B) shown below:

$$(\text{ignition loss}) - (\text{heating loss}) \leq 3 \quad (B)$$

The modified conjugated diene base polymer described above is excellent in interaction with a filler such as silica, carbon black, and the rubber composition using the polymer in combination with the precipitated silica described above is excellent in a low heat build-up, abrasion resistance and a fracture characteristic.

Effects of the Invention

According to the present invention, provided is a tire having the foregoing characteristics prepared by using a rubber composition in which a rubber component is excellent in interaction with silica and/or carbon black and dispersibility of the above fillers can be improved and which is excellent in a low heat build-up, a fracture characteristic and abrasion resistance.

MODE FOR CARRYING OUT THE INVENTION

First, the modified conjugated diene base polymer used in the present invention shall be explained.

The modified conjugated diene base polymer of the present invention is a modified polymer obtained by reacting a conjugated diene base polymer having an active site in a molecule with a hydrocarbyloxysilane compound which may have a functional group to introduce the functional group into the active site. Further, it may be a modified polymer obtained by subjecting the functional group site to condensation reaction in the presence of a condensation accelerating agent comprising a compound of an element belonging to at least one of 4th group, 12th group, 13th group, 14th group and 15th group in the periodic table.

Usually, the active site of the conjugated diene base polymer is subjected to modification reaction with the hydrocarbyloxysilane compound which may have a functional group, and then the condensation accelerating agent is added before the condensation reaction. After adding the condensation accelerating agent before adding the hydrocarbyloxysilane compound (before the modification reaction), the condensation reaction may be carried out after adding the above hydrocarbyloxysilane compound to carry out the modification reaction.

The conjugated diene base polymer used in the present invention is obtained by polymerizing a diene base monomer alone or copolymerizing it with other monomers. A production method therefor shall not specifically be restricted, and any of a solution polymerization method, a gas phase polymerization method and a bulk polymerization method can be used, and the solution polymerization method is particularly preferred. A polymerization system may be any of a batch system and a continuous system.

Further, metal in the active site which is present in a molecule of the conjugated diene base polymer is preferably one kind selected from alkali metals and alkali earth metals. Alkali metal is more preferred, and lithium is particularly preferred.

In the solution polymerization method described above, for example, an alkali metal compound and/or an alkali earth metal compound, particularly a lithium compound is used as a polymerization initiator, and a conjugated diene compound alone or a conjugated diene compound and an aromatic vinyl compound are subjected to anionic polymerization, whereby the targeted polymer can be produced.

Further, it is effective as well to mix a halogen-containing monomer and activate the halogen atom in the polymer by an organic metal compound. For example, it is effective as well to subject a bromine part of a copolymer containing a isoprene unit, a paramethylstyrene unit and a parabromomethylstyrene unit to lithiation to turn it into an active site.

The active site shall not be restricted as long as it is present in a molecule of the polymer. When the polymer is prepared by anionic polymerization using an alkali metal compound and/or an alkali earth metal compound as a polymerization initiator, the active site is present usually at an end of the molecule, and the polymer having such an active end is preferred.

The conjugated diene compound includes, for example, 1,3-butadiene, isoprene, 1,3-pentadiene, 2,3-dimethyl-1,3-butadiene, 2-phenyl-1,3-butadiene, 1,3-hexadiene and the like. They may be used alone or in combination of two or more kinds thereof, and among them, 1,3-butadiene, isoprene and 2,3-dimethyl-1,3-butadiene are particularly preferred.

The aromatic vinyl compound used for copolymerization with the above conjugated diene compounds includes, for example, styrene, α-methylstyrene, 1-vinylnaphthalene, 3-vinyltoluene, ethylvinylbenzene, divinylbenzene, 4-cyclohexylstyrene, 2,4,6-trimethylstyrene and the like. They may be used alone or in combination of two or more kinds thereof, and among them, styrene is particularly preferred.

Further, when the conjugated diene compound and the aromatic vinyl compound are used as the monomers to be copolymerized, 1,3-butadiene and styrene are particularly suitably used respectively from the viewpoints of practical use such as availability of the monomers and the like and excellent aspects such as the living property in the anionic polymerization characteristics.

When the solution polymerization method is used, a monomer concentration in a solvent is preferably 5 to 50% by mass, more preferably 10 to 30% by mass. When the conjugated diene compound and the aromatic vinyl compound are used to be copolymerized, a content of the aromatic vinyl compound in a mixture of the charged monomers falls in a range of 0 to 55% by mass, preferably 3 to 50% by mass and more preferably 6 to 45% by mass.

The alkali metal compound and/or the alkali earth metal compound as the polymerization initiator shall not specifically be restricted, and a hydrocarbyllithium and a lithium amide compound are preferably used. When a hydrocarbyllithium is used, conjugated diene base polymers having a hydrocarbyl group at a polymerization initiation end and a polymerization-active site at the other end are obtained. Also, when the lithium amide compound is used, conjugated diene base polymers having a nitrogen-containing group at a polymerization initiation end and a polymerization-active site at the other end are obtained.

The hydrocarbyllithiums are preferably a hydrocarbyllithium having a hydrocarbyl group having 1 to 20 carbon atoms and includes, for example, methyllithium, ethyllithium, n-propyllithium, isopropyllithium, n-butyllithium, sec-butyllithium, tert-octyllithium, n-decyllithium, phenyllithium, 2-naphthyllithium, 2-butyl-phenyllithium, 4-phenylbutyllithium, cyclohexyllithium, cyclopentyllithium, reaction products of diisopropenylbenzene with butyllithium and the like. Among them, n-butyllithium is particularly suited.

On the other hand, the lithium amide compounds include, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamid and the like. Among them, cyclic lithium amides such as lithium hexamethyleneimide, lithium pyrrolidide, lithium piperidide, lithium heptamethyleneimide, lithium dodecamethyleneimide are preferred from the viewpoints of an interaction effect to carbon black and polymerization initiation ability, and lithium hexamethyleneimide and lithium pyrrolidide are particularly suited.

In general, compounds which are prepared in advance from a secondary amine and a lithium compound can be used as the lithium amide compounds for the polymerization, but they can be prepared as well in the polymerization system (in-situ).

A use amount of the polymerization initiators is selected in a range of preferably 0.2 to 20 millimole per 100 g of the monomers.

A process in which the lithium compound described above is used as the polymerization initiator to produce the conjugated diene polymer by anionic polymerization shall not specifically be restricted, and processes which have so far publicly been known can be used.

To be specific, the conjugated diene compound or the conjugated diene compound and the aromatic vinyl compound are subjected to anionic polymerization in an organic solvent which is inactive to the reaction, for example, a hydrocarbon base solvent such as aliphatic, alicyclic and aromatic hydrocarbon compounds using the lithium compound as the polymerization initiator in the presence of a randomizer used if necessary, whereby the targeted conjugated diene base polymer is obtained.

The hydrocarbon base solvent described above is preferably a hydrocarbon base solvent having 3 to 8 carbon atoms, and capable of being listed are, for example, propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and the like. They may be used alone or in a mixture of two or more kinds thereof.

The randomizer used if necessary means a compound which controls a microstructure of the conjugated diene base polymer, for example, an increase in a 1-2 bond of butadiene parts in a butadiene-styrene copolymer and a 3-4 bond in an isoprene polymer, or which controls a composition distribution of monomer units in a conjugated diene compound-aromatic vinyl compound copolymer, for example, has an action such as randomization of a butadiene unit and a styrene unit in a butadiene-styrene copolymer. The randomizer shall not specifically be restricted, and optional compounds suitably selected from publicly known compounds which have so far usually been used as randomizers can be used. To be specific, capable of being listed are dimethoxybenzene, tetrahydrofuran, dimethoxyethane, ethers and tertiary amines such as diethylene glycol dibutyl ether, diethylene glycol dimethyl ether, 2,2-bis(2-tetrahydrofuryl)propane, triethylamine, pyridine, N-methylmorpholine, N,N,N',N'-tetramethylethylenediamine, 1,2-piperidinoethane. Further, potassium salts such as potassium t-amylate, potassium t-butoxide and sodium salts such as sodium t-amylate can be used as well.

The above randomizers may be used alone or in combination of two or more kinds thereof. A use amount thereof is selected in a range of preferably 0.01 to 1000 mole equivalent per mole of the lithium compound.

When reactivity of the initiator used in the present invention is intended to be improved, or the aromatic vinyl compound introduced into the polymer is arranged at random or a simple chain of the aromatic vinyl compound is intended to be provided, a potassium compound may be added together with the polymerization initiator. Used as the potassium compound added together with the polymerization initiator are, for example, potassium alkoxides represented by potassium isopropoxide, potassium t-butoxide, potassium t-amyloxide, potassium t-heptaoxide, potassium benzyloxide; potassium phenoxide; potassium salts of isovaleric acid, caprylic acid, lauric acid, palmitic acid, stearic acid, oleic acid, linolenic acid, benzoic acid, phthalic acid, 2-ethylhexanoic acid and the like; potassium salts of organic sulfonic acids such as dodecylbenzenesulfonic acid, tetradecylbenzenesulfonic acid, hexadecylbenzenesulfonic acid, octadecylbenzenesulfonic acid and the like; potassium salts of organic phosphorous acid partial esters such as diethyl phosphite, diisopropyl phosphite, diphenyl phosphite, dibutyl phosphite, dilauryl phosphite and the like.

The above potassium compounds can be added in an amount of 0.005 to 0.5 mole per gram atomic equivalent of alkali metal of the initiator. If the amount is less than 0.005 mole, an addition effect of the potassium compound (improvement of reactivity of the initiator, randomization of the aromatic vinyl compound or providing with a simple chain) is not exerted. On the other hand, if it exceeds 0.5 mole, the polymerization activity is reduced to result in reducing the productivity to a large extent, and the modification efficiency in carrying out reaction in which the polymer end is modified with the functional group is reduced.

A temperature in the above polymerization reaction is selected in a range of preferably 0 to 150° C., more preferably 20 to 130° C. The polymerization reaction can be carried out under a developed pressure, but usually, it is operated preferably at a pressure which is sufficient for keeping substantially the monomer liquid. That is, the higher pressure can be used, if necessary, while depending on the individual substances to be polymerized, the polymerization medium used and the polymerization temperature used, and such pressure can be obtained by a suitable method such as applying pressure to the reactor by gas which is inert to the polymerization reaction.

In the above polymerization, all raw materials participating in the polymerization such as the polymerization initiator, the solvent, the monomers are used preferably after removing reaction inhibitory substances such as moisture, oxygen, carbon dioxide, protic compounds.

When the polymer is obtained in the form of an elastomer, the polymer or the copolymer obtained has preferably a glass transition temperature (Tg) of −95 to −15° C. which is determined by a differential thermal analysis method. Controlling the glass transition temperature in the range described above makes it possible to inhibit the viscosity from growing high and obtain the polymer which is easy to handle.

In the present invention, the conjugated diene base polymer having an active site in a molecule thus obtained is modified by reacting the active site with a hydrocarbyloxysilane compound (hereinafter referred to as a modifying agent) which may have a functional group.

The hydrocarbyloxysilane compound which may have a functional group shall not specifically be restricted in a kind thereof, and capable of being used are compounds having a functional group which has affinity with silica, for example, a hydrocarbyloxysilane compound represented by Formula (I):

(wherein $R^a$ and $R^b$ each represent independently a monovalent aliphatic hydrocarbon group having 1 to 20 carbon atoms or a monovalent aromatic hydrocarbon group having 6 to 18 carbon atoms; a is an integer of 0 to 2; when plural $OR^b$ are present, plural $OR^b$ may be the same as or different from each other; and an active proton is not contained in a molecule) and/or a partial condensation product thereof and a hydrocarbyloxysilane compound represented by Formula (II):

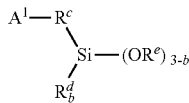

(wherein $A^1$ represents a monovalent group having at least one functional group selected from epoxy, isocyanate, imine, cyano, carboxylic ester, carboxylic anhydride, cyclic tertiary amine, non-cyclic tertiary amine, pyridine, silazane and sulfide; $R^c$ represents a single bond or a divalent hydrocarbon group; $R^d$ represents a monovalent aliphatic hydrocarbon group having 1 to 20 carbon atoms, a monovalent aromatic hydrocarbon group having 6 to 18 carbon atoms or a reactive group; $R^e$ represents a monovalent aliphatic hydrocarbon group having 1 to 20 carbon atoms or a monovalent aromatic hydrocarbon group having 6 to 18 carbon atoms; b is an integer of 0 to 2; when plural $R^d$ and $OR^e$ are present, plural $R^d$ and $OR^e$ may be the same as or different from each other; and an active proton is not contained in a molecule) and/or a partial condensation product thereof.

In this connection, the partial condensation product means a product in which a part (not all) of a SiOR group in the hydrocarbyloxysilane compound is turned into a SiOSi bond by condensation.

In the modification reaction described above, at least 20% of a polymer chain in the polymer used has preferably a living property.

The specific examples of the hydrocarbyloxysilane compound represented by Formula (I) used for reaction with the active site of the polymer includes, for example, tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, ethyltripropoxysilane, ethyltriisopropoxysilane, propyltrimethoxysilane, propyltriethoxysilane, propyltripropoxysilane, propyltriisopropoxysilane, butyltrimethoxysilane, butyltriethoxysilane, phenyltrimethoxysilane, phenyltriethoxysilane, dimethyldimethoxysilane, methylphenyldimethoxysilane, dimethyldiethoxysilane, vinyltrimethoxysilane, vinyltriethoxysilane, divinyldiethoxysilane and the like. Among them, tetraethoxysilane, methyltriethoxysilane and dimethyldiethoxysilane are suited. They may be used alone or in combination of two or more kinds thereof.

The specific examples of the hydrocarbyloxysilane compounds represented by Formula (II) used for reaction with the active site of the polymer include preferably the epoxy-containing hydrocarbyloxysilane compounds, for example, 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)-methyldimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane and the like. Among them, 3-glycidoxypropyltrimethoxysilane and 2-(3,4-epoxycyclohexyl)ethyltrimethoxysilane are particularly suited.

The isocyanate group-containing hydrocarbyloxysilane compounds include 3-isocyanatopropyltrimethoxysilane, 3-isocyanatopropyltriethoxysilane, 3-isocyanatopropylmethyldiethoxysilane, 3-isocyanatopropyltriisopropoxysilane and the like, and among them, 3-isocyanatopropyltrimethoxysilane is particularly preferred.

Capable of being preferably listed as the imine group-containing hydrocarbyloxysilane compounds are N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine and trimethoxysilyl compounds, methyldiethoxysilyl compounds, ethyldimethoxysilyl compounds and the like each corresponding to the above triethoxysilyl compounds. Among them, N-(1,3-dimethylbutylidene)-3-(triethoxysilyl)-1-propaneamine and N-(1-methylpropylidene)-3-(triethoxysilyl)-1-propaneamine are particularly suited. Also, the imine(amidine) group-containing compounds include preferably 1-[3-trimethoxysilyl]propyl]-4,5-dihydroimidazole, 3-(1-hexamethyleneimino)propyl(triethoxy)silane, (1-hexamethyleneimino)methyl (trimethoxy)silane, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole and the like, and among them, N-(3-triethoxysilylpropyl)-4,5-dihydroimidazole and N-(3-isopropoxysilylpropyl)-4,5-dihydroimidazole are preferred.

The carboxylic ester-containing hydrocarbyloxysilane compounds include preferably, for example, 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane and the like, and among them, 3-methacryloyloxypropyltriethoxysilane is preferred.

The carboxylic anhydride-containing hydrocarbyloxysilane compounds include, for example, 3-trimethoxysilylpropylsuccinic anhydride, 3-triethoxysilylpropylsuccinic anhydride, 3-methyldiethoxysilylpropylsuccinic anhydride and the like, and among them, 3-triethoxysilylpropylsuccinic anhydride is preferred.

The cyano group-containing hydrocarbyloxysilane compounds include, for example, 2-cyanoethylpropyltriethoxysilane and the like.

The cyclic tertiary amine-containing hydrocarbyloxysilane compounds include, for example, 3-(1-hexamethyleneimino)propyltriethoxysilane, 3-(1-hexamethyleneimino)propyltrimethoxysilane, (1-hexamethyleneimino)methyltriethoxysilane, (1-hexamethyleneimino)methyltrimethoxysilane, 2-(1-hexamethyleneimino)ethyltriethoxysilane, 3-(1-hexamethyleneimino)ethyltrimethoxysilane, 3-(1-pyrrolidinyl)propyltrimethoxysilane, 3-(1-pyrrolidinyl)propyltriethoxysilane, 3-(1-heptamethyleneimino)propyltriethoxysilane, 3-(1-dodecamethyleneimino)propyltriethoxysilane, 3-(1-hexamethyleneimino)propyldiethoxymethylsilane, 3-(1-hexamethyleneimino)propyldiethoxyethylsilane, 3-[10-(triethoxysilyl)decyl]-4-oxazoline and the like. Among them, 3-(1-hexamethyleneimino)propyltriethoxysilane and (1-hexamethyleneimino)methyltriethoxysilane can preferably be listed.

The non-cyclic tertiary amine-containing hydrocarbyloxysilane compounds include, for example, 3-dimethylaminopropyltriethoxysilane, 3-dimethylaminopropyltrimethoxysilane, 3-diethylaminopropyltriethoxysilane, 3-dimethylaminopropyltrimethoxysilane, 2-dimethylaminoethyltriethoxysilane, 2-dimethylaminoethyltrimethoxysilane, 3-dimethylaminopropyldiethoxymethylsilane, 3-dibutylaminopropyltriethoxysilane and the like, and among them, 3-dimethylaminopropyltriethoxysilane and 3-diethylaminopropyltriethoxysilane are suited.

The pyridine-containing hydrocarbyloxysilane compounds include, for example, 2-trimethoxysilylethylpyridine and the like.

The silazane-containing hydrocarbyloxysilane compounds include, for example, N,N-bis(trimethylsilyl)-aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane and the like. It is preferably N,N-bis(trimethylsilyl)aminopropyltriethoxysilane, N,N-bis(trimethylsilyl)aminopropylmethyldiethoxysilane or 1-trimethylsilyl-2,2-dimethoxy-1-aza-2-silacyclopentane.

The sulfide-containing hydrocarbyloxysilane compounds include, for example, bis(3-triethoxysilylpropyl)tetrasulfide, bis(3-triethoxysilylpropyl)disulfide and the like.

Among the hydrocarbyloxy compounds described above which may have a functional group, a compound containing in a molecule a bifunctional silicon atom whose primary amino group is protected and in which one hydrocarbyloxy group and one reactive group are bonded to the same silicon atom, for example, at least one selected from compounds represented by Formula (III), Formula (IV) and Formula (V) is particularly preferably used.

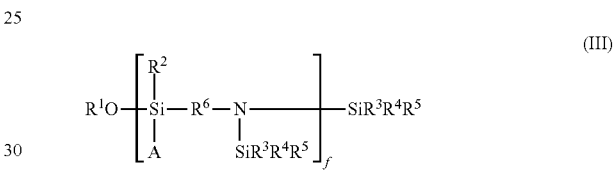

(III)

(wherein $R^1$ and $R^2$ each represent independently a hydrocarbon group having 1 to 20 carbon atoms; $R^3$ to $R^5$ each represent independently a hydrocarbon group having 1 to 20 carbon atoms; $R^6$ represents a divalent hydrocarbon group having 1 to 12 carbon atoms; A represents a reactive group; and f represents an integer of 1 to 10),

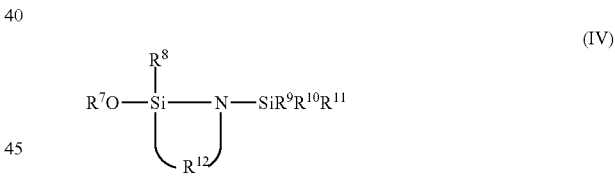

(IV)

(wherein $R^7$ to $R^{11}$ each represent independently a hydrocarbon group having 1 to 20 carbon atoms; and $R^{12}$ represents a divalent hydrocarbon group having 1 to 12 carbon atoms) and

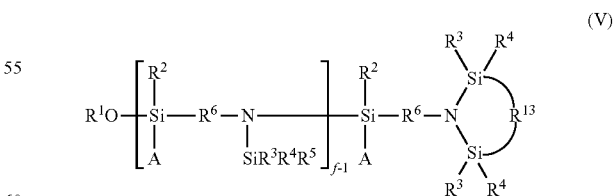

(V)

(wherein $R^1$ and $R^2$ each represent independently a hydrocarbon group having 1 to 20 carbon atoms; $R^3$ to $R^5$ each represent independently a hydrocarbon group having 1 to 20 carbon atoms; $R^6$ represents a divalent hydrocarbon group having 1 to 12 carbon atoms; $R^{13}$ represents a divalent hydrocarbon group having 1 to 12 carbon atoms; A represents a reactive group; and f represents an integer of 1 to 10) and/or partial condensation products thereof.

The specific examples of the hydrocarbon group having 1 to 20 carbon atoms each represented independently in Formulas (III) to (V) described above include, for example, methyl, ethyl, n-propyl, isopropyl, n-butyl, isobutyl, sec-butyl, tert-butyl, various pentyls, various hexyls, various octyls, various decyls, various dodecyls, various tetradecyls, various hexadecyls, various octadecyls, various icosyls, cyclopentyl, cyclohexyl, vinyl, propenyl, allyl, hexenyl, octenyl, cyclopentenyl, cyclohexenyl, phenyl, tolyl, xylyl, naphthyl, benzyl, phenethyl, naphthylmethyl and the like. Among them, methyl, ethyl, n-propyl, isopropyl, n-butyl, isobutyl, sec-butyl and tert-butyl each having 1 to 4 carbon atoms are preferred, and ethyl, methyl and tert-butyl are more preferred.

The divalent hydrocarbon group having 1 to 12 carbon atoms includes an alkylene group having 1 to 12 carbon atoms, an arylene group having 6 to 12 carbon atoms, an arylenealkylene group having 7 to 12 carbon atoms and the like.

The alkylene group having 1 to 12 carbon atoms may be either linear or branched and includes, to be specific, linear alkylene groups such as methylene, ethylene, trimethylene, tetramethylene, hexamethylene, octamethylene, decamethylene and branched alkylene groups such as propylene, isopropylene, isobutylene, 2-methyltrimethylene, isopentylene, isohexylene, isooctylene, 2-ethylhexylene, isodecylene.

The arylene group having 6 to 12 atoms includes, for example, phenylene, methylphenylene, dimethylphenylene, naphthylene and the like, and the arylenealkylene group having 7 to 12 carbon atoms includes, for example, phenylenemethylene, phenyleneethylene, xylylene and the like.

Among them, the alkylene groups having 1 to 4 carbon atoms are preferred, and trimethylene is particularly preferred.

The reactive group of A is preferably a halogen atom and a hydrocarbyloxy group having 1 to 20 carbon atoms. The halogen atom includes fluorine, chlorine, bromine and iodine, and among them, chlorine is preferred.

The hydrocarbyloxy group having 1 to 20 carbon atoms includes an alkoxy group having 1 to 20 carbon atoms, an aryloxy group having 6 to 20 carbon atoms, an aralkyloxy group having 7 to 20 carbon atoms and the like.

The alkoxy group having 1 to 20 carbon atoms includes methoxy, ethoxy, n-propoxy, n-butoxy, isobutoxy, sec-butoxy, tert-butoxy, various hexoxys, various octoxys, various decyloxys, various dodecyloxys, various tetradecyloxys, various hexadecyloxys, various octadecyloxys, various icosyloxys and the like. The aryloxy group having 6 to 20 carbon atoms includes, for example, phenoxy, methylphenoxy, dimethylphenoxy, naphthoxy and the like, and the aralkyloxy group having 7 to 20 carbon atoms includes, for example, benzyloxy, phenethyloxy, naphthylmethoxy and the like. Among them, the alkoxy groups having 1 to 4 carbon atoms are preferred, and ethoxy is particularly preferred.

The other reactive groups include groups containing a carbonyl group, an acid anhydride residue, various dihydroimidazolinyl groups, a N-methylpyrrolidonyl group, a isocyanato group and the like.

Also, two of $R^3$, $R^4$ and $R^5$ in Formula (III) may be combined to form a 4- to 7-membered ring together with a silicon atom to which they are bonded, and similarly two of $R^9$, $R^{10}$ and $R^{11}$ in Formula (IV) may be combined to form a 4- to 7-membered ring together with a silicon atom to which they are bonded. Rings having methylene having 4 to 7 carbon atoms can be listed as the 4- to 7-membered ring.

N,N-bis(trimethylsilyl)aminopropylmethyldimethoxysilane, N,N-bis(trimethylsilyl)aminopropylmethyldiethoxysilane, N,N-bis(trimethylsilyl)aminoethylmethyldimethoxysilane, N,N-bis(trimethylsilyl)aminoethylmethyldiethoxysilane, 1-trimethylsilyl-2-ethoxy-2-methyl-1-aza-2-silacyclopentane and the like can be listed as the compound containing a bifunctional silicon atom which has a protected primary amino group and a hydrocarbyloxy group bonded to a silicon atom.

The compounds in which A is a halogen atom include, for example, N,N-bis(trimethylsilyl)aminopropylmethylmethoxychlorosilane, N,N-bis(trimethylsilyl)aminopropylmethylethoxychlorosilane, N,N-bis(trimethylsilyl)aminoethylmethylmethoxychlorosilane, N,N-bis(trimethylsilyl)aminoethylmethylethoxychlorosilane and the like.

Among the above compounds, preferred are N,N-bis(trimethylsilyl)aminopropylmethyldimethoxysilane, N,N-bis(trimethylsilyl)aminopropylmethyldiethoxysilane and 1-trimethylsilyl-2-ethoxy-2-methyl-1-aza-2-silacyclopentane.

The above modifying agents may be used alone or in combination of two or more kinds thereof. Further, the modifying agent may be a partial condensation product. In this connection, the partial condensation product means a product in which a part (not all) of SiOR in the modifying agent is turned into a SiOSi bond by condensation.

In the modification reaction, at least 10% of a polymer chain in the polymer used has preferably a living property.

The modifying agent may be bonded to any of a polymerization initiation end, a polymerization termination end, a polymer principal chain and a side chain, and it is introduced preferably into a polymerization initiation end or a polymerization termination end from the viewpoint that energy can be inhibited from disappearing from the polymer end to improve the low heat build-up.

Reaction at the living polymerization end, for example, reaction of $P^-Li^+$ with the modifying agent in which f is 1 in Formula (III) can be shown by the following chemical equation:

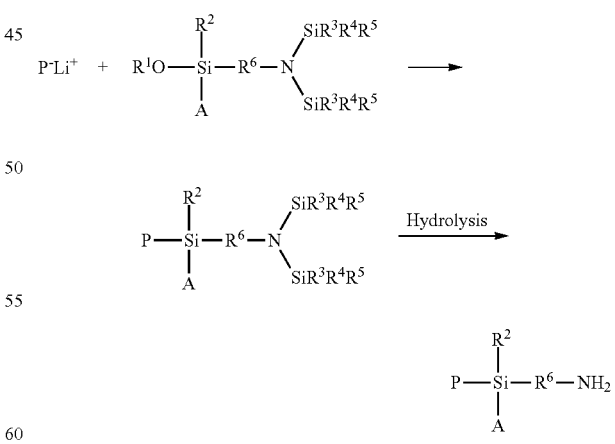

P represents a (co)polymer chain of the conjugated diene compound or the conjugated diene compound and the aromatic vinyl compound.

Similarly, reaction at the living polymerization end, for example, reaction of $P^-Li^+$ with the modifying agent represented by Formula (IV) can be shown by the following chemical equation:

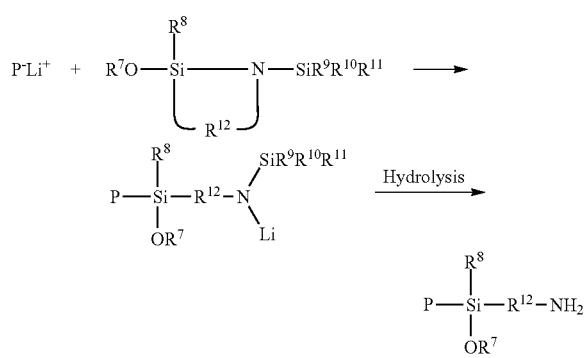

In the modifying reaction by the modifying agent described above, a use amount of the modifying agent is preferably 0.5 to 200 mmol/kg·conjugated diene base polymer. It is more preferably 1 to 100 mmol/kg·conjugated diene base polymer, particularly preferably 2 to 50 mmol/kg·conjugated diene base polymer. In this connection, the conjugated diene base polymer means a mass of only the polymer which does not contain additives such as an antioxidant and the like which are added in or after the production. Controlling a use amount of the modifying agent in the ranges described above makes the filler excellent in dispersibility and improves the mechanical characteristic, the abrasion resistance and the low heat build-up after the vulcanization.

An addition method of the modifying agent shall not specifically be restricted and includes a method in which it is added in one lump, a method in which it is divided and added and a method in which it is continuously added, and the method in which it is added in one lump is preferred.

The modifying reaction in the present invention is carried out preferably in solution reaction (may be a solution containing the unreacted monomers used in the polymerization). A mode of the modifying reaction shall not specifically be restricted, and it may be carried out by using a batch type reactor or may be carried out in a continuous system using equipment such as a multistage continuous reactor and an inline mixer. It is important to carry out the modifying reaction before carrying out desolvent treatment, water treatment, heat treatment and various operations necessary for isolating the polymer after finishing the polymerization reaction.

A polymerization temperature of the conjugated diene base polymer can be applied as it is to a temperature of the modifying reaction. To be specific, a preferred range thereof includes 0 to 120° C. It is more preferably 20 to 100° C. If the temperature is lowered, a viscosity of the polymer tends to be raised, and if the temperature grows high, the polymerization active end is liable to be deactivated. Accordingly, both are not preferred.

The modifying reaction time is usually 1 minute to 5 hours, preferably 2 minutes to 1 hour.

Also, a publicly known antioxidant and a publicly known reaction terminating agent can be added, if necessary, in a step after introducing a residue of the hydrocarbyloxy compound which may have a functional group into an active site of the polymer in the modifying reaction.

In the present invention, preferably used is the polymer subjected to condensation reaction in which the hydrocarbyloxysilane compound introduced by the modification described above participates. A specific condensation accelerating agent is used in order to accelerate the condensation reaction.

The condensation accelerating agent used in the above case can be added before the modifying reaction, and it is added preferably after the modifying reaction and before starting the condensation reaction. When it is added before the modifying reaction, direct reaction with the active end takes place, and the hydrocarbyloxysilyl group is not introduced into the active end in a certain case.

When added after starting the condensation reaction, the condensation accelerating agent is not evenly dispersed, and the catalyst performance is reduced in a certain case.

An addition timing of the condensation accelerating agent is usually after 5 minutes to 5 hours, preferably after 15 minutes to 1 hour since starting the modifying reaction.

The condensation accelerating agent used in the present invention comprises a compound of an element belonging to at least one of 4th group, 12th group, 13th group, 14th group and 15th group in the periodic table. To be specific, the condensation accelerating agent comprises a compound of titanium (Ti), zirconium (Zr), bismuth (Bi), tin (Sn) or aluminum (Al), and it is preferably alkoxide, carboxylate or acetylacetonate complex salt of the elements. Among them, at least one selected from (a) to (h) shown below is preferred:
(a) alkoxide of titanium
(b) carboxylate of titanium
(c) acetylacetonate complex salt of titanium
(d) carboxylate of bismuth
(e) alkoxide of zirconium
(f) carboxylate of zirconium
(g) alkoxide of aluminum
(h) carboxylate of aluminum The specific condensation accelerating agents include, in the case of the titanium compounds,
tetrakis(2-ethyl-1,3-hexanediolato) titanium,
tetrakis(2-methyl-1,3-hexanediolato) titanium,
tetrakis(2-propyl-1,3-hexanediolato) titanium,
tetrakis(2-butyl-1,3-hexanediolato) titanium,
tetrakis(1,3-hexanediolate) titanium,
tetrakis(1,3-pentanediolato) titanium,
tetrakis(2-methyl-1,3-pentanediolato) titanium,
tetrakis(2-ethyl-1,3-pentanediolato) titanium,
tetrakis(2-propyl-1,3-pentanediolato) titanium,
tetrakis(2-butyl-1,3-pentanediolato) titanium,
tetrakis(1,3-heptanediolato) titanium,
tetrakis(2-methyl-1,3-heptanediolato) titanium,
tetrakis(2-ethyl-1,3-heptanediolato) titanium,
tetrakis(2-propyl-1,3-heptanediolato) titanium,
tetrakis(2-butyl-1,3-heptanediolato) titanium,
tetrakis(2-ethylhexoxy) titanium, tetramethoxytitanium, tetraethoxytitanium, tetra-n-propoxytitanium, tetraisopropoxytitanium, tetra-n-butoxytitanium,
tetra-n-butoxytitanium oligomer, tetraisobutoxytitanium, tetra-sec-butoxytitanium, tetra-tert-butoxytitanium,
titanium bis(oleate)bis(2-ethylhexanoate),
titanium dipropoxy bis(triethanolaminate),
titanium dibutoxy bis(triethanolaminate),
titanium tributoxystearate, titanium tripropoxyacetylacetonate, titanium dipopoxy bis(acetylacetonate),
titanium tripropoxy(ethylacetoacetate),
titanium propoxyacetylacetonate bis(ethylacetoacetate), titanium tributoxyacetylacetonate,
titanium dibutoxy bis(acetylacetonate),
titanium tributoxyethylacetoacetate,
titanium butoxyacetylacetonate bis(ethylacetoacetate),
titanium tetrakis(acetylacetonate), titanium diacetylacetonate bis(ethylacetoacetate),
bis(2-ethylhexanoate) titanium oxide,
bis(laurate) titanium oxide, bis(naphthenate) titanium oxide, bis(stearate) titanium oxide, bis(oleate) titanium oxide, titanium bis(linolate) oxide,
titanium tetrakis(2-ethylhexanoate),
titanium tetrakis(laurate), titanium tetrakis(naphthenate),
titanium tetrakis(stearate), titanium tetrakis(oleate), titanium tetrakis(linolate),
titanium di-n-butoxide (bis-2,4-pentanedionate),
bis(tetramethylheptanedionate) titanium oxide, bis(pentanedionate) titanium oxide, titanium tetra(lactate) and the like.

Among them, tetrakis(2-ethyl-1,3-hexanediorato) titanium, tetrakis(2-ethylhexoxy)titanium and titanium di-n-butoxide (bis-2,4-pentanedionate) are preferred.

Further, the specific examples of the compounds of elements other than titanium include
bismuth tris(2-ethylhexanoate), bismuth tris(laurate),
bismuth tris(naphthenate), bismuth tris(stearate),
bismuth tris(oleate), bismuth tris(linolate), tetraethoxyzirconium, tetra-n-propoxyzirconium,
tetra-i-propoxyzirconium, tetra-n-butoxyzirconium,
tetra-sec-butoxyzirconium, tetra-tert-butoxyzirconium, tetra (2-ethylhexoxy)zirconium, zirconium tributoxystearate, zirconium tributoxyacetylacetonate,
zirconium dibutoxy bis(acetylacetonate),
zirconium tributoxyethylacetoacetate,
zirconium butoxyacetylacetonate bis(ethylacetoacetate), zirconium tetrakis(acetylacetonate),
zirconium diacetylacetonate bis(ethylacetoacetate),
bis(2-ethylhexanoate) zirconium oxide,
bis(laurate) zirconium oxide, bis(naphthenate) zirconium oxide,
bis(stearate) zirconium oxide, bis(oleate) zirconium oxide, bis(linolate) zirconium oxide,
zirconium tetrakis(2-ethylhethanoate),
zirconium tetrakis(laurate), zirconium tetrakis(naphthatcnaphthenate),
zirconium tetrakis(stearate), zirconium tetrakis(oleate),
zirconium tetrakis(linolate), triethoxyalumium,
tri-n-propoxyaluminium, tri-i-propoxyaluminium,
tri-n-butoxyaluminium, tri-sec-butoxyaluminium,
tri-tert-butoxyaluminium, tri(2-ethylhexoxy)aluminum,
aluminum dibutoxystearate, aluminum dibutoxyacetylacetonate, aluminum butoxy bis(acetylacetonate),
aluminum dibutoxyethylacetoacetate,
aluminum tris(acetylacetonate),
aluminum tris(ethylacetoacetate),
aluminum tris(2-ethylhexanoate), aluminum tris(laurate),
aluminum tris(naphthenate), aluminum tris(stearate),
aluminum tris(oleate), aluminum tris(linolate) and the like.

Among them, suited are bismuth tris(2-ethylhexanoate), tetra-n-propoxyzirconium, tetra-n-butoxyzirconium, bis(2-ethylhexanoate)zirconium oxide, bis(oleate)zirconium oxide, tri-i-propoxyaluminium, tri-sec-butoxyaluminium, tris(2-ethylhexanoate)aluminum, tris(stearate)aluminum, zirconium tetrakis(acetylacetonate) and aluminum tris(acetylacetonate).

In respect to a use amount of the above condensation accelerating agent, a mole number of the compound described above is preferably 0.1 to 10, particularly preferably 0.5 to 5 in terms of a mole ratio based on a total amount of the hydrocarbyloxysilyl group. If it is less than 0.1, the condensation reaction does not progress sufficiently. On the other hand, if it is used in excess of 10, an effect of the condensation accelerating agent is saturated, and it is not economically preferred.

The condensation reaction in the present invention is carried out preferably in the presence of water. Water may be used in the form of a single substance, a solution of alcohol or the like and a dispersed micelle in a hydrocarbon solvent. The modified polymer or a solution thereof may be brought into direct contact with water. Further, water contained potentially in a compound which can release water in a reaction system, such as water adsorbed on solid, hydrated water of a hydrate can be effectively used as well. Accordingly, compounds which can readily release water such as solid having adsorbed water, hydrates and the like can be used as well in combination with the organic metal compound described above.

Temperature in the condensation reaction is preferably 20 to 180° C., more preferably 30 to 160° C. and particularly preferably 50 to 150° C.

If the temperature in the condensation reaction is lower than 20° C., the condensation reaction proceeds slowly, and the condensation reaction is likely to be incapable of being completed. Accordingly, a change with the passage of time is brought about on the resulting modified conjugated diene base polymer, and a problem in terms of the quality is caused in a certain case. On the other hand, if it exceeds 180° C., aging reaction of the polymer proceeds to reduce the physical properties in a certain case, and therefore it is not preferred.

The condensation reaction time is usually 5 minutes to 10 hours, preferably 15 minutes to 5 hours. If it is shorter than 5 minutes, the condensation reaction is not completed. On the other hand, if it exceeds 10 hours, the condensation reaction is saturated, and therefore it is not preferred.

A pressure of the reaction system in the condensation reaction is usually 0.01 to 20 MPa, preferably 0.05 to 10 MPa.

The mode of the condensation reaction shall not specifically be restricted, and it may be carried out by means of a batch type reactor or may be carried out by a continuous method using equipment such as a multistage continuous type reactor and the like. Further, the above condensation reaction and desolvent may be carried out at the same time.

After carrying out the condensation treatment in the manner described above, after-treatments which have so far publicly been known are carried out, and the targeted modified conjugated diene base polymer can be obtained.

In the present invention, an amino group originating in the modifying agent in the modified conjugated diene base polymer modified by the compound containing in a molecule a bifunctional silicon atom whose primary amino group is protected and in which one hydrocarbyloxy group and one reactive group are bonded to the same silicon atom may be protected or deprotected to be converted into a primary amine. When deprotection is carried out, the following procedure is used.

That is, a silyl protecting group on the above protected amino group is hydrolyzed, whereby it is converted into an isolated amino group. This is subjected to desolvent treatment, whereby the dried polymer having a primary amino group is obtained. The protected primary amino group originating in the modifying agent can be subjected, if necessary, to the deprotection in any stage from a stage including the condensation treatment described above to a stage in which desolvent is carried out to obtain the dried polymer.

In the present invention, after carrying out the condensation treatment in the manner described above, deprotection is further carried out, and a group which is bonded to an active site of the modified conjugated diene base polymer and which originates in the compound containing a bifunctional silicon atom is subjected to hydrolysis treatment to convert the protected primary amino group in the above group into an isolated amino group, whereby the targeted modified conjugated diene base polymer can be obtained.

A Mooney viscosity ($ML_{1+4}$/100° C.) of the modified conjugated diene base polymer used in the present invention is preferably 10 to 150, more preferably 15 to 130. The rubber composition which is excellent in a kneading operability and a mechanical characteristic after vulcanization can be obtained by controlling a value of the Mooney viscosity to the range described above.

The rubber composition used for the tire of the present invention contains preferably at least 15% by mass of the modified conjugated diene base polymer described above as the rubber component. A more preferred content of the modified conjugated diene base polymer contained in the rubber composition is 30% by mass or more, and it is particularly suitably 40% by mass or more. Controlling a content of the modified conjugated diene base polymer contained in the rubber composition to 15% by mass or more makes it possible to obtain the rubber composition having desired physical properties.

The modified conjugated diene base polymer may be used alone or in combination of two or more kinds thereof. Other rubber components used in combination with the modified conjugated diene base polymer include natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber, halogenated butyl rubber and mixtures thereof. Also, a part thereof may be provided with a branch structure by using a multifunctional modifying agent such as, for example, zinc tetrachloride, silicon tetrachloride.

The rubber composition used for the tire of the present invention contains structural precipitated silica (silica) as a filler.

The precipitated silica used in the present invention is obtained by a method in which an aqueous solution of alkali silicate such as sodium silicate is neutralized by mineral acid such as sulfuric acid to thereby deposit and precipitate hydrate silica, that is, a method according to a production method of so-called precipitation process hydrated silica.

In the structural precipitated silica used in the present invention, characteristic values measured by a method used usually for measurement of silica, carbon black and the like satisfy the following relations.

That is, it is precipitated silica in which a cetyltrimethylammonium bromide-adsorbing specific surface area (CTAB) (m²/g) and a diameter $A_{ac}$ (nm) of the mode in the number of primary aggregates determined by an acoustic measurement of particle size distribution satisfy preferably equation (A) shown below:

$$A_{ac} \geq -0.76 \times (CTAB) + 274 \tag{A}$$

and in which an ignition loss (mass reduction % when heated at 750° C. for 3 hours) and a heating loss (mass reduction % when heated at 105° C. for 2 hours) satisfy equation (B) shown below:

$$(\text{ignition loss}) - (\text{heating loss}) \leq 3 \tag{B}$$

The cetyltrimethylammonium bromide-adsorbing specific surface area (CTAB) is a specific surface area (m²/g) of precipitated silica calculated from an adsorbing amount of cetyltrimethylammonium bromide onto a surface of precipitated silica.

CTAB can be measured according to a method described in ASTM D3765-92. The method described in ASTM D3765-92 is a method for measuring CTAB of carbon black, and therefore it shall be slightly modified. That is, a standard product of carbon black is not used, and a cetyltrimethylammonium bromide (hereinafter abbreviated as CE-TRAB) standard solution is prepared. This is used to standardize a precipitated silica OT (sodium di-2-ethylhexylsulfosuccinate) solution to calculate a specific surface area from an adsorbing amount of CE-TRAB assuming that an adsorbing cross-sectional area per one molecule of CE-TRAB onto a surface of precipitated silica is 0.35 nm².

The precipitated silica used in the present invention has CTAB of 50 to 250 m²/g, preferably 80 to 230 m²/g. If CTAB is less than 50 m²/g, the rubber composition is likely to be notably reduced in a storage modulus, and if it is larger than 250 m²/g, the unvulcanized rubber composition is likely to be rised in a viscosity.

A diameter (acoustic particle size distribution diameter) measured as a particle diameter of precipitated silica by means of an acoustic measuring equipment of particle size distribution is an index for development of a structural property. The particles of precipitated silica contain particles prepared by primary aggregation of particles having a fine particle diameter and particles prepared by slight secondary aggregation of the above particles.

Measurement by the acoustic measuring equipment of particle size distribution is carried out after subjecting a 0.01M KCl aqueous solution of precipitated silica to dispersion treatment by a supersonic wave for 5 minutes to remove bubbles and to breaking secondary aggregates. Particle diameters of primary aggregates of precipitated silica and distribution of particle numbers thereof are obtained, and assuming that among them, a diameter of the particles observed in the highest frequency is set to $A_{ac}$ (nm), the following equation has to be satisfied:

$$A_{ac} \geq -0.76 \times (CTAB) + 274 \tag{A}$$

When $A_{ac}$ does not satisfy the above condition, the rubber composition is reduced in either or both of a low heat build-up property and abrasion resistance. Further, $A_{ac}$ is preferably 1 μm or less. If it is larger than 1 μm, precipitated silica becomes a breaking nucleus, and the kinetic properties of the rubber composition are likely to be damaged.

Further, a difference between reduction (%) in a mass of the precipitated silica used in the present invention when heating it and a reduction (%) in a mass thereof when igniting it is preferably:

$$(\text{ignition loss}) - (\text{heating loss}) \leq 3 \tag{B}$$

The heating loss and the ignition loss are measured according to a test method of a compounding ingredient for rubber in JIS $K_{6220}$-1, wherein the heating loss is a reduction (%) in the mass when heated usually at 105±2° C. for 2 hours, and the ignition loss is a reduction (%) in the mass when ignited usually at 750±25° C. for 3 hours.

A use amount of the precipitated silica used in the present invention is preferably 10 to 150 parts by mass based on 100 parts by mass of the rubber component.

The precipitated silica used in the present invention is produced according to a production process for precipitation process hydrated silica. For example, a reaction vessel filled in advance with a fixed amount of warm water is charged with sodium silicate and sulfuric acid while controlling pH and temperature to obtain a hydrated silica slurry after fixed time passes.

Subsequently, the hydrated silica slurry is separated by filtrating through a filtering device capable of washing a cake, such as a filter press and washed to remove by-produced electrolytes, and then a slurry is prepared from the hydrated silica cake obtained and dried by means of a dryer such as a spray dryer and the like to thereby produce precipitated silica.

In the rubber composition used for the tire of the present invention, precipitated silica is used as a reinforcing filler, and a silane coupling agent is preferably compounded for the purpose of further enhancing a reinforcing property and a low heat build-up thereof.

The silane coupling agent is reacted with silanol groups remaining on a surface of precipitated silica and the rubber component polymer to act as a bonding bridge between the precipitated silica and the rubber and form a reinforcing phase.

The silane coupling agent used in the present invention is preferably at least one selected from the group consisting of compounds represented by formulas shown below:

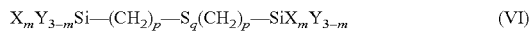  (VI)

(wherein X is $C^nH_{2n+1}O$ (n is an integer of 1 to 3) or a chlorine atom; Y is an alkyl group having 1 to 3 carbon atoms; m is an integer of 1 to 3; p is an integer of 1 to 9; q is an integer of 1 or more and may have distribution; provided that when m is 1, two Y may be same or different and that when m is 2 or 3, two or three X may be same or different);

  (VII)

(wherein X is $C_nH_{2n+1}O$ (n is an integer of 1 to 3) or a chlorine atom; Y is an alkyl group having 1 to 3 carbon atoms; W is a mercapto group, a vinyl group, an amino group, a glycidoxy group or an epoxy group; m is an integer of 1 to 3; r is an integer of 0 to 9; provided that when m is 1, two Y may be same or different and that when m is 2 or 3, two or three X may be same or different); and

  (VIII)

(wherein X is $C_nH_{2n+1}O$ (n is an integer of 1 to 3) or a chlorine atom; Y is an alkyl group having 1 to 3 carbon atoms; Z is a benzothiazolyl group, a N,N-dimethylthiocarbamoyl group or a methacryloyl group; m is an integer of 1 to 3; p is an integer of 1 to 9; q is an integer of 1 or more and may have distribution; provided that when m is 1, two Y may be same or different and that when m is 2 or 3, two or three X may be same or different).

To be specific, the silane coupling agent represented by Formula (VI) includes bis-(3-triethoxysilylpropyl)tetrasulfide, bis-(3-trimethoxysilylpropyl)tetrasulfide, bis-(3-methyldimethoxysilylpropyl)tetrasulfide, bis-(3-triethoxysilylethyl)tetrasulfide, bis-(3-triethoxysilylpropyl)disulfide, bis-(3-trimethoxysilylpropyl)disulfide and bis-(3-triethoxysilylpropyl)trisulfide.

The silane coupling agent represented by Formula (VII) includes 3-mercaptopropyltrimethoxysilane, 3-mercaptopropyltriethoxysilane, 3-mercaptopropylmethyldimethoxysilane, vinyltrimethoxysilane, vinyltriethoxysilane, 3-aminopropyltrimethoxysilane, 3-aminopropyltriethoxysilane, γ-glycidoxypropyltrimethoxysilane and γ-glycidoxypropylmethyldiethoxysilane.

The silane coupling agent represented by Formula (VIII) includes 3-trimethoxysilylpropyl-N,N-dimethylthiocarbamoyl tetrasulfide, 3-trimethoxysilylpropylbenzothiazolyl tetrasulfide and 3-trimethoxysilylpropylmethacryloyl monosulfide.

Among them, bis-(3-triethoxysilylpropyl)polysulfide and 3-trimethoxysilylpropylbenzothiazolyl tetrasulfide are suited from the viewpoint of a reinforcing property-improving effect.

The silane coupling agents may be used alone or in combination of two or more kinds thereof.

In the rubber composition used for the tire of the present invention, the modified polymer in which a functional group having high affinity with precipitated silica is introduced into an active site in a molecular is used as the rubber component, and therefore a compounding amount of the silane coupling agent can be reduced compared with a usual case. A preferred compounding amount of the silane coupling agent is selected, though varied depending on the kind of the silane coupling agent, in a range of 1 to 20% by mass based on the precipitated silica. If the above amount is less than 1% by mass, an effect of the silane coupling agent is less liable to be sufficiently exerted, and if it exceeds 20% by mass, gelation of the rubber component is likely to be brought about. A preferred compounding amount of the silane coupling agent falls in a range of 5 to 15% by mass from the viewpoints of an effect of the silane coupling agent and prevention of gelation.

In the rubber composition used for the tire of the present invention, carbon black can be used as a reinforcing filler together with the precipitated silica. Abrasion resistance of the rubber composition can be enhanced by compounding the carbon black.

Carbon black shall not specifically be restricted, and SRF, GPF, FEF, HAF, ISAF, SAF and the like are used, and carbon blacks having an iodine adsorption amount (IA) of 60 mg/g or more and a dibutyl phthalate absorption amount (DBP) of 80 ml/100 g or more are preferred. The grip performance and an effect of improving the fracture resistance are increased by using the carbon black, and HAF, ISAF and SAF which are excellent in providing abrasion resistance are particularly preferred.

The carbon blacks may be used alone or in combination of two or more kinds thereof.

A use amount of the carbon black is preferably 80 parts by mass or less based on 100 parts by mass of the rubber component, and a total compounding amount obtained by summing the carbon black and the precipitated silica is preferably 120 parts by mass or less. Controlling the total compounding amount to 120 parts by mass or less based on 100 parts by mass of the rubber component makes it possible to enhance sufficiently the low heat build-up and the abrasion resistance.

Various chemicals usually used in the rubber industry, for example, vulcanizing agents, vulcanization accelerators, process oils, antioxidants, scorch inhibitors, zinc oxide, stearic acid and the like can be added, if necessary, to the rubber composition used for the tire of the present invention as long as the objects of the present invention are not damaged.

The rubber composition used for the tire of the present invention is obtained by kneading the components by means of a mixer including an open type mixer such as a roll and a closed type mixer such as a Banbury mixer, and it is vulcanized after subjected to molding processing and can be applied to various rubber products. It can be used for applications in industrial products such as rubber vibration insulators, fenders, belts and hoses as well as applications in tires such as tire treads, under treads, carcasses, side walls and bead parts. In particular, it can suitably be used as rubber for treads of tires for low fuel consumption, large-sized tires and high performance tires which are excellent in a balance between a low heat build-up, abrasion resistance and fracture strength.

The tire of the present invention is characterized by applying the rubber composition described above to a tread member. The tire prepared by using the rubber composition for a tread member has low rolling resistance since the rubber composition has a low heat build-up, and it is excellent in abrasion resistance. Ordinary air or air in which an oxygen partial pressure is changed or inert gas such as nitrogen can be used for gas charged into the tire of the present invention.

EXAMPLES

The present invention shall be explained below in further detail with reference to examples, but the present invention shall by no means be restricted by these examples. Various measurements in the examples were carried out by the following methods.

Physical properties of modified conjugated diene base polymer:
(1) Vinyl Content (% by Mass Based on 100 of a Butadiene Part) of a Conjugated Diolefin Part
  Determined by 270 MHz $^1$H-NMR.
(2) Bonded Styrene Content (% by Mass in the Polymer)
  Determined by 270 MHz $^1$H-NMR.
(3) Weight Average Molecular Weight (Mw)
  Determined in terms of polystyrene by means of gel permeation chromatography (GPC) (HLC-8220GPC, manufactured by Tosoh Corp.).
(4) Mooney Viscosity ($ML_{1+4}/100°$ C.)
  Determined at preheating of 1 minute, a rotor operating time of 4 minutes using an L rotor and a temperature of 100° C. according to JIS K6300.

Physical Properties of Precipitated Silica:
(1) Measurement of Acoustic Particle Size Distribution Diameter:
  A 0.01M KCl aqueous solution of each precipitated silica was subjected to dispersion treatment for 5 minutes by a supersonic wave to remove bubbles, and then the mode $A_{ac}$ (nm) in diameters of primary aggregates of precipitated silica was measured by means of a supersonic measuring equipment of particle size distribution DT1200 (manufactured by Dispersion Technology, Inc.).
(2) Measurement of CTAB:
  CTAB was measured according to a method described in ASTM D3765-92. The method described in ASTM D3765-92 is a method for measuring CTAB of carbon black, and therefore it was slightly modified. That is, IRB #3 (83.0 m$^2$/g) which was a standard product of carbon black was not used, and a cetyltrimethylammonium bromide (hereinafter abbreviated as CE-TRAB) standard solution was prepared separately. This solution was used to standardize a precipitated silica OT (sodium di-2-ethylhexylsulfosuccinate) solution to calculate a specific surface area (m$^2$/g) from an adsorbing amount of CE-TRAB assuming that an adsorbing cross-sectional area per one molecule of CE-TRAB onto a surface of precipitated silica was 0.35 nm$^2$. This is because it is considered that carbon black and precipitated silica are different in a surface and therefore different in an adsorbing amount of CE-TRAB even if they have the same surface area.
(3) Measurement of Heating Loss and Ignition Loss:
  A sample of precipitated silica was weighed and heated at 105° C. for 2 hours in a case of a heating loss and heated at 750° C. for 3 hours in a case of an ignition loss, and then the mass was measured to represent a difference from a mass of the sample before heated by % based on a mass thereof before heated.

Evaluation of Rubber Composition:
  The rubber compositions were measured and evaluated by the following methods.
(1) Low Heat Build-Up:
  The values of tan δ (50° C.) were measured under the conditions of a tensile dynamic strain of 1%, a frequency of 10 Hz and a temperature of 50° C. by means of a dynamic spectrometer manufactured by Rheometric Scientific, Inc. They were shown by an index, wherein the value thereof obtained in the comparative example was set to 100. The larger the numerical value is, the better the low heat build-up is.
(2) Rolling Resistance of Tire:
  A pneumatic tire having a tire size of 185/70R14 was provided with an inner pressure of 170 kPa, and then it was allowed to run on a large size test drum at a speed of 80 km/hour for prescribed time while applying a load of 395 kg. Next, driving force of the drum was cut off to leave it inertially running, and rolling resistance of the tire was determined from speed reduction of the tire and shown by an index, wherein the value thereof obtained in the comparative example was set to 100. The larger the index is, the smaller the rolling resistance is.
(3) Abrasion Resistance:
  Determined from a depth of remaining grooves after allowing the same tire as used for evaluating rolling resistance of the tire to run 10,000 km on domestic city roads. They were shown by an index, wherein the value thereof obtained in the comparative example was set to 100. The larger the index is, the better the abrasion resistance is.

Production Example 1

Synthesis of Polymer A

A pressure-tight glass vessel having an inner content of 800 ml which was dried and substituted with nitrogen was charged with a cyclohexane solution (16%) of butadiene and a cyclohexane solution (21%) of styrene so that 40 g of butadiene monomer and 10 g of styrene monomer were contained therein and further charged with 0.34 millimole of 2,2-ditetrahydrofurylpropane, and 0.38 millimole of n-butyllithium (BuLi) was added thereto. Then, polymerization was carried out for 1.5 hour in a warm water bath of 50° C. The polymerization conversion rate was almost 100%.

Then, 0.5 ml of an isopropanol 5 weight % solution of 2,6-di-t-butyl-p-cresol (BHT) was further added to the polymerization system to terminate the reaction, and the solution was dried up by a conventional method to thereby obtain polymer A. A polymerization formulation and analytical values of the polymer thus obtained are shown in Table 1.

Production Example 2

Synthesis of Polymer B

A pressure-tight glass vessel having an inner content of 800 ml which was dried and substituted with nitrogen was charged with a cyclohexane solution (16%) of butadiene and a cyclohexane solution (21%) of styrene so that 40 g of butadiene monomer and 10 g of styrene monomer were contained therein and further charged with 0.34 millimole of 2,2-ditetrahydrofurylpropane, and 0.38 millimole of n-butyllithium (BuLi) was added thereto. Then, polymerization was carried out for 1.5 hour in a warm water bath of 50° C. The polymerization conversion rate was almost 100%.

After 0.33 millimole of tin tetrachloride was added to the above polymerization system, modification reaction was further carried out at 50° C. for 30 minutes. Then, 0.5 ml of an isopropanol 5 weight % solution of 2,6-di-t-butyl-p-cresol (BHT) was further added to the polymerization system to terminate the reaction, and the solution was dried up by a conventional method to thereby obtain polymer B. A polymerization formulation and analytical values of the polymer thus obtained are shown in Table 1.

Production Example 3

Synthesis of Polymer C

Polymer C was obtained in the same manner as in Production Example 2, except that in Production Example 2, tin tetrachloride which was a modifying agent was changed to tetraethoxysilane. A polymerization formulation and analytical values of the polymer thus obtained are shown in Table 1.

Production Example 4

Synthesis of Polymer D

Polymer D was obtained in the same manner as in Production Example 2, except that in Production Example 2, tin tetrachloride which was a modifying agent was changed to N-(3-triethoxysilylpropyl)-4,5-dihydroimidazole. A polymerization formulation and analytical values of the polymer thus obtained are shown in Table 1.

Production Example 5

Synthesis of Polymer E

Polymer E was obtained in the same manner as in Production Example 2, except that in Production Example 2, tin tetrachloride which was a modifying agent was changed to N-(1,3-dimethylbutylidene)-3-(triethoxysilyl)-1-propaneamine. A polymerization formulation and analytical values of the polymer thus obtained are shown in Table 1.

Production Example 6

Synthesis of Polymer F

Polymer F was obtained in the same manner as in Production Example 2, except that in Production Example 2, tin tetrachloride which was a modifying agent was changed to N,N-bis(trimethylsilyl)aminopropylmethyldiethoxysilane. A polymerization formulation and analytical values of the polymer thus obtained are shown in Table 1.

Production Example 7

Synthesis of Polymer G

Polymer G was obtained in the same manner as in Production Example 2, except that in Production Example 2, tin tetrachloride which was a modifying agent was changed to N,N-bis(trimethylsilyl)aminopropyltriethoxysilane. A polymerization formulation and analytical values of the polymer thus obtained are shown in Table 1.

Production Example 8

Synthesis of Polymer H

A pressure-tight glass vessel having an inner content of 800 ml which was dried and substituted with nitrogen was charged with a cyclohexane solution (16%) of butadiene and a cyclohexane solution (21%) of styrene so that 40 g of butadiene monomer and 10 g of styrene monomer were contained therein and further charged with 0.34 millimole of 2,2-ditetrahydrofurylpropane, and 0.38 millimole of n-butyllithium (BuLi) was added thereto. Then, polymerization was carried out for 1.5 hour in a warm water bath of 50° C. The polymerization conversion rate was almost 100%.

After 0.33 millimole of N-(3-triethoxysilylpropyl)-4,5-dihydroimidazole was added to the polymerization system, modification reaction was further carried out at 50° C. for 30 minutes. Then, after 0.33 millimole of tin bis(2-ethylhexanoate) and 1.26 millimole of water were added to the polymerization system, condensation reaction was carried out at 50° C. for 30 minutes. Thereafter, 0.5 ml of an isopropanol 5 weight % solution of 2,6-di-t-butyl-p-cresol (BHT) was further added to the polymerization system to terminate the reaction, and the solution was dried up by a conventional method to thereby obtain polymer H. A polymerization formulation and analytical values of the polymer thus obtained are shown in Table 2.

Production Example 9

Synthesis of Polymer I

A polymer I was obtained in the same manner as in Production Example 8, except that in Production Example 8, N-(3-triethoxysilylpropyl)-4,5-dihydroimidazole which was a modifying agent was changed to N,N-bis(trimethylsilyl)aminopropylmethyldiethoxysilane and that tin bis(2-ethylhexanoate) which was a condensation accelerating agent was changed to tetrakis(2-ethyl-1,3-hexanediolato)titanium. A polymerization formulation and analytical values of the polymer thus obtained are shown in Table 2.

Production Example 10

Synthesis of Polymer J

Polymer J was obtained in the same manner as in Production Example 9, except that in Production Example 9, tetrakis(2-ethylhexoxy)titanium was used in place of tetrakis(2-ethyl-1,3-hexanediolato)titanium which was a condensation accelerating agent. A polymerization formulation and analytical values of the polymer thus obtained are shown in Table 2.

Production Example 11

Synthesis of Polymer K

Polymer K was obtained in the same manner as in Production Example 9, except that in Production Example 9, tin bis(2-ethylhexanoate) was used in place of tetrakis(2-ethyl-1,3-hexanediolato)titanium which was a condensation accelerating agent. A polymerization formulation and analytical values of the polymer thus obtained are shown in Table 2.

Production Example 12

Synthesis of Polymer L

A polymer L was obtained in the same manner as in Production Example 9, except that in Production Example 9, N,N-bis(trimethylsilyl)aminopropylmethyldiethoxysilane which was a modifying agent was changed to methyltriethoxysilane and that tetrakis(2-ethyl-1,3-hexanediolato)titanium which was a condensation accelerating agent was changed to bis(2-ethylhexanoate)zirconium oxide. A polymerization formulation and analytical values of the polymer thus obtained are shown in Table 2.

TABLE 1

|  | Production Example | | | | | | |
|---|---|---|---|---|---|---|---|
|  | 1 | 2 | 3 | 4 | 5 | 6 | 7 |
| Modified conjugated diene base polymer | A | B | C | D | E | F | G |
| Vinyl content controlling agent | | | | | | | |
| DTHFP (mmol) *1 | 0.34 | 0.34 | 0.34 | 0.34 | 0.34 | 0.34 | 0.34 |
| Polymerization monomers | | | | | | | |
| Styrene (g) | 10 | 10 | 10 | 10 | 10 | 10 | 10 |
| Butadiene (g) | 40 | 40 | 40 | 40 | 40 | 40 | 40 |
| Polymerization initiator | | | | | | | |
| BuLi (mmol) *2 | 0.38 | 0.38 | 0.38 | 0.38 | 0.38 | 0.38 | 0.38 |
| Modifying agents | | | | | | | |
| Modifying agent A (mmol) *3 | | 0.33 | | | | | |
| Modifying agent B (mmol) *4 | | | 0.33 | | | | |
| Modifying agent C (mmol) *5 | | | | 0.33 | | | |
| Modifying agent D (mmol) *6 | | | | | 0.33 | | |
| Modifying agent E (mmol) *7 | | | | | | 0.33 | |
| Modifying agent F (mmol) *8 | | | | | | | 0.33 |
| Modifying agent G (mmol) *9 | | | | | | | |
| Condensation accelerating agents | | | | | | | |
| Condensation accelerating agent A (mmol) *10 | | | | | | | |
| Condensation accelerating agent B (mmol) *11 | | | | | | | |
| Condensation accelerating agent C (mmol) *12 | | | | | | | |
| Condensation accelerating agent D (mmol) *13 | | | | | | | |
| Bonded styrene amount (% by mass) | 20.0 | 20.0 | 19.8 | 19.5 | 20.1 | 20 | 20 |
| Vinyl group content (% by mass) | 52 | 51.9 | 52.1 | 52 | 51.7 | 55 | 55 |
| Molecular weight Mw/10$^4$ | 28.0 | 57.2 | 31.4 | 35.4 | 23.2 | 22.0 | 23.2 |
| Mooney viscosity (ML$_{1+4}$/100° C.) | 64 | 76 | 52 | 60 | 32 | 25 | 36 |

TABLE 2

|  | Production Example | | | | |
|---|---|---|---|---|---|
|  | 8 | 9 | 10 | 11 | 12 |
| Modified conjugated diene base polymer | H | I | J | K | L |
| Vinyl content controlling agent | | | | | |
| DTHFP (mmol) *1 | 0.34 | 0.34 | 0.34 | 0.34 | 0.34 |
| Polymerization monomers | | | | | |
| Styrene (g) | 10 | 10 | 10 | 10 | 10 |
| Butadiene (g) | 40 | 40 | 40 | 40 | 40 |
| Polymerization initiator | | | | | |
| BuLi (mmol) *2 | 0.38 | 0.38 | 0.38 | 0.38 | 0.38 |
| Modifying agents | | | | | |
| Modifying agent A (mmol) *3 | | | | | |
| Modifying agent B (mmol) *4 | | | | | |
| Modifying agent C (mmol) *5 | 0.33 | | | | |
| Modifying agent D (mmol) *6 | | 0.33 | 0.33 | 0.33 | |
| Modifying agent E (mmol) *7 | | | | | |
| Modifying agent F (mmol) *8 | | | | | |
| Modifying agent G (mmol) *9 | | | | | 0.33 |
| Condensation accelerating agents | | | | | |
| Condensation accelerating agent A (mmol) *10 | 0.33 | | 0.33 | | |
| Condensation accelerating agent B (mmol) *11 | | 0.33 | | | |
| Condensation accelerating agent C (mmol) *12 | | | | 0.33 | |
| Condensation accelerating agent D (mmol) *13 | | | | | 0.33 |
| Bonded styrene amount (% by mass) | 19.8 | 20 | 21 | 20 | 20 |
| Vinyl group content (% by mass) | 52.3 | 56 | 55 | 56 | 59 |
| Molecular weight Mw/10$^4$ | 62.3 | 25.5 | 25.5 | 55.2 | 53.0 |
| Mooney viscosity (ML$_{1+4}$/100° C.) | 72 | 32 | 35 | 71 | 68 |

Notes (Table 1 and Table 2)
*1: 2,2-ditetrahydrofurylpropane
*2: n-butyllithium
*3: tin tetrachloride
*4: tetraethoxysilane
*5: N-(3-triethoxysilylpropyl)-4,5-dihydroimidazole
*6: N-(1,3-dimethylbutylidene)-3-(triethoxysilyl)-1-propaneamine
*7: N,N-bis(trimethylsilyl)aminopropylmethyldiethoxysilane
*8: N,N-bis(trimethylsilyl)aminopropyltriethoxysilane
*9: methyltriethoxysilane
*10: tin bis(2-ethylhexanoate)
*11: tetrakis (2-ethyl-1,3-hexanediolato) titanium
*12: tetrakis (2-ethylhexoxy) titanium
*13: bis (2-ethylhexanoate) zirconium oxide Production of Precipitated Silica Production Example A A jacketed stainless-made reaction vessel having a volume of 180 L which was equipped with a stirrer was charged with 93 L of water and 0.6 L of a sodium silicate aqueous solution (SiO$_2$ 160 g/L, SiO$_2$/Na$_2$O mole ratio: 3.3) and heated up to 96° C. A concentration of Na$_2$O in the resulting solution was 0.005 mol/L.

While maintaining the above solution at a temperature of 96° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 96° C. for 30 minutes. A concentration of silica in the resulting solution was 55 g/L. Subsequently, sulfuric acid having the concentration described above was added until pH of the solution was 3 to obtain a silicic acid slurry. The silicic acid slurry thus obtained was filtrated by means of a filter press, and the filtrated solid was washed with water to obtain a wet cake. Then, the wet cake was turned into a slurry by means of an emulsifying equipment, and the slurry was dried by means of a spray type dryer to obtain a wet process precipitated silica A. The physical properties of the precipitated silica thus obtained are shown in Table 3.

Production Example B

The same vessel as used in Production Example A was charged with 93 L of water and 0.6 L of the sodium silicate aqueous solution which was the same raw material as used in Production Example A and heated up to 90° C. A concentration of $Na_2O$ in the resulting solution was 0.005 mol/L.

While maintaining the above solution at a temperature of 90° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 90° C. for 30 minutes. A concentration of silica in the resulting solution was 55 g/L. Subsequently, sulfuric acid having the concentration described above was added until pH of the solution was 3 to obtain a silicic acid slurry. Then, wet process precipitated silica B was obtained by the same method as in Production Example A. The physical properties of the precipitated silica thus obtained are shown in Table 3.

Production Example C

The same vessel as used in Production Example A was charged with 93 L of water and 0.6 L of the sodium silicate aqueous solution which was the same raw material as used in Production Example A and heated up to 84° C. A concentration of $Na_2O$ in the resulting solution was 0.005 mol/L.

While maintaining the above solution at a temperature of 84° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 48 minutes, and the solution was gelatinized. Addition was further continued, and the reaction was terminated in 90 minutes. After terminating the reaction, a temperature of the reaction liquid was maintained at 84° C. for 30 minutes. A concentration of silica in the resulting solution was 55 g/L. Subsequently, sulfuric acid having the concentration described above was added until pH of the solution was 3 to obtain a silicic acid slurry. Then, a wet process precipitated silica C was obtained by the same method as in Production Example A. The physical properties of the precipitated silica thus obtained are shown in Table 3.

Production Example D

The same vessel as used in Production Example A was charged with 93 L of water and 0.6 L of the sodium silicate aqueous solution which were the same raw materials as used in Production Example A and heated up to 90° C. A concentration of $Na_2O$ in the resulting solution was 0.005 mol/L.

While maintaining the above solution at a temperature of 90° C., dropwise added at the same time were the same sodium silicate aqueous solution as described above at a flow rate of 540 ml/minute and sulfuric acid (18 mo/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 90° C. for 60 minutes. A concentration of silica in the resulting solution was 55 g/L. Subsequently, sulfuric acid having the concentration described above was added until pH of the solution was 3 to obtain a silicic acid slurry. Then, wet process precipitated silica D was obtained by the same method as in Production Example A. The physical properties of the precipitated silica thus obtained are shown in Table 3.

Production Example E

The same vessel as used in Production Example A was charged with 93 L of water and 0.6 L of the sodium silicate aqueous solution which was the same raw material as used in Production Example A and heated up to 78° C. A concentration of $Na_2O$ in the resulting solution was 0.005 mol/L.

While maintaining the above solution at a temperature of 78° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 49 minutes, and the solution was gelatinized. Addition was further continued, and the reaction was terminated in 90 minutes. After terminating the reaction, a temperature of the reaction liquid was maintained at 78° C. for 60 minutes. A concentration of silica in the resulting solution was 55 g/L. Subsequently, sulfuric acid having the concentration described above was added until pH of the solution was 3 to obtain a silicic acid slurry. Then, wet process precipitated silica E was obtained by the same method as in Production Example A. The physical properties of the precipitated silica thus obtained are shown in Table 3.

Production Example F

The same vessel as used in Production Example A was charged with 93 L of water and 0.6 L of the sodium silicate aqueous solution which was the same raw material as used in Production Example A and heated up to 65° C. A concentration of Na$_2$O in the resulting solution was 0.005 mol/L.

While maintaining the above solution at a temperature of 65° C., dropwise added at the same time were the same sodium silicate aqueous solution as described above at a flow rate of 540 ml/minute and sulfuric acid (18 mol/L) at a flow rate of 24 ml/minute. A Na$_2$O concentration in the reaction solution was maintained in a range of 0.00 to 0.01 mol/L with controlling the flow rates to carry out neutralization reaction. The solution started becoming clouded in the middle of the reaction and was increased in a viscosity in 50 minutes, and the solution was gelatinized. Addition was further continued, and the reaction was terminated in 90 minutes. After terminating the reaction, a temperature of the reaction liquid was maintained at 65° C. for 60 minutes. A concentration of silica in the resulting solution was 55 g/L. Subsequently, sulfuric acid having the concentration described above was added until pH of the solution was 3 to obtain a silicic acid slurry. Then, wet process precipitated silica F was obtained by the same method as in Production Example A. The physical properties of the precipitated silica thus obtained are shown in Table 3.

Production Example G

The same vessel as used in Production Example A was charged with 86 L of water and 0.5 L of the sodium silicate aqueous solution which was the same raw material as used in Production Example A and heated up to 96° C. A concentration of Na$_2$O in the resulting solution was 0.005 mol/L.

While maintaining the above solution at a temperature of 96° C., dropwise added at the same time were the same sodium silicate aqueous solution as described above at a flow rate of 615 ml/minute and sulfuric acid (18 mol/L) at a flow rate of 27 ml/minute. A Na$_2$O concentration in the reaction solution was maintained in a range of 0.00 to 0.01 mol/L with controlling the flow rates to carry out neutralization reaction. The solution started becoming clouded in the middle of the reaction and was increased in a viscosity in 40 minutes, and the solution was gelatinized. Addition was further continued, and the reaction was terminated in 90 minutes. After terminating the reaction, a temperature of the reaction liquid was maintained at 96° C. for 30 minutes. A concentration of silica in the resulting solution was 62 g/L. Subsequently, sulfuric acid having the concentration described above was added until pH of the solution was 3 to obtain a silicic acid slurry. Then, wet process precipitated silica G was obtained by the same method as in Production Example A. The physical properties of the precipitated silica thus obtained are shown in Table 3.

TABLE 3

| | Production Example | | | | | | |
|---|---|---|---|---|---|---|---|
| | A | B | C | D | E | F | G |
| Kind of precipitated silica | A | B | C | D | E | F | G |
| CTAB (m$^2$/g) | 112 | 134 | 157 | 127 | 172 | 210 | 80 |
| Particle size distribution diameter A$_{ac}$ (nm) | 208 | 178 | 158 | 192 | 149 | 125 | 213 |
| −0.76 × CTAB + 274 | 189 | 172 | 155 | 177 | 143 | 114 | 212 |
| (Ignition loss) − (heating loss) (% by mass) | 2.6 | 2.6 | 2.1 | 2.2 | 2.9 | 2.9 | 2.8 |

Examples 1 to 17 and Comparative Examples 1 to 8

The modified conjugated diene base polymers A to L prepared in Production Examples 1 to 7 shown in Table 1 and Production Examples 8 to 12 shown in Table 2 and the precipitated silica A to G shown in Table 3 were used to prepare the rubber compositions according to the recipes shown in Tables 4 to 7, and they were vulcanized under the conditions of 160° C. and 15 minutes. A low heat build-up of the respective rubber compositions and rolling resistance and abrasion resistance of tires produced by using the respective rubber compositions were measured by the methods described above.

The measured results thereof are shown in Tables 4 to 7. In Tables 4 to 7, all of the low heat build-up, the rolling resistance and the abrasion resistance are shown by indices, wherein those in Comparative Examples 1, 3, 5 and 7 shown in the respective tables are set to 100. It is shown that the larger the numerical values are, the better the properties are.

TABLE 4 parts by weight

| | | Comparative Example | | Example | | | | | | | |
|---|---|---|---|---|---|---|---|---|---|---|---|
| | | 1 | 2 | 1 | 2 | 3 | 4 | 5 | 6 | 7 | |
| Modified conjugated diene base | | | | | | | | | | | |
| Polymer A | | 70 | | | | | | | | | |
| Polymer F | | | 70 | 70 | 70 | 70 | 70 | 70 | 70 | 70 | |
| Butadiene rubber | *1 | 30 | 30 | 30 | 30 | 30 | 30 | 30 | 30 | 30 | |
| Aroma oil | *2 | 25 | 25 | 25 | 25 | 25 | 25 | 25 | 25 | 25 | |
| Carbon black | *3 | 15 | 15 | 15 | 15 | 15 | 15 | 15 | 15 | 15 | |
| Hydrated silica AQ | *4 | 65 | 65 | | | | | | | | |
| Precipitated silica A | | | | 65 | | | | | | | |
| Precipitated silica B | | | | | 65 | | | | | | |
| Precipitated silica C | | | | | | 65 | | | | | |
| Precipitated silica D | | | | | | | 65 | | | | |
| Precipitated silica E | | | | | | | | 65 | | | |
| Precipitated silica F | | | | | | | | | 65 | | |
| precipitated silica G | | | | | | | | | | 65 | |
| Silane coupling agent | *5 | 5.2 | 5.2 | 5.2 | 5.2 | 5.2 | 5.2 | 5.2 | 5.2 | 5.2 | |
| Stearic acid | | 2 | 2 | 2 | 2 | 2 | 2 | 2 | 2 | 2 | |
| Antioxidant 6C | *6 | 1.5 | 1.5 | 1.5 | 1.5 | 1.5 | 1.5 | 1.5 | 1.5 | 1.5 | |
| Zinc oxide | | 3 | 3 | 3 | 3 | 3 | 3 | 3 | 3 | 3 | |
| Vulcanization accelerator DPG | *7 | 0.5 | 0.5 | 0.5 | 0.5 | 0.5 | 0.5 | 0.5 | 0.5 | 0.5 | |
| Vulcanization accelerator NS | *8 | 1 | 1 | 1 | 1 | 1 | 1 | 1 | 1 | 1 | |
| Sulfur | | 1.5 | 1.5 | 1.5 | 1.5 | 1.5 | 1.5 | 1.5 | 1.5 | 1.5 | |
| Low heat build-up | | 100 | 129 | 151 | 147 | 144 | 149 | 145 | 134 | 166 | |
| Rolling resistance | | 100 | 110 | 118 | 115 | 114 | 116 | 114 | 103 | 123 | |
| Abrasion resistance | | 100 | 105 | 107 | 109 | 110 | 108 | 112 | 125 | 106 | |

Notes:
*1: BR150L manufactured by Ube Industries, Ltd.
*2: Aromax #3 manufactured by Fuji Kosan Company, Ltd.
*3: N339, Seast KH manufactured by Tokai Carbon Co., Ltd.
*4: Nipsil AQ manufactured by Tosoh Silica Corporation
*5: Si75 manufactured by Degussa AG.
*6: N-(1,3-dimethylbutyl)-N'-phenyl-p-phenylenediamine
*7: diphenylguanidine
*8: N-t-butyl-2-benzothiazylsulfeneamide

TABLE 5 parts by weight

| | | Comparative Example | | Example | | | | |
|---|---|---|---|---|---|---|---|---|
| | | 3 | 4 | 8 | 9 | 10 | 11 | |
| Modified conjugated diene base | | | | | | | | |
| Polymer A | | 70 | | | | | | |
| Polymer B | | | 70 | | | | | |
| Polymer C | | | | 70 | | | | |
| Polymer D | | | | | 70 | | | |
| Polymer E | | | | | | 70 | | |
| Polymer F | | | | | | | 70 | |
| Butadiene rubber | *1 | 30 | 30 | 30 | 30 | 30 | 30 | |
| Aroma oil | *2 | 37.5 | 37.5 | 37.5 | 37.5 | 37.5 | 37.5 | |
| Carbon black | *3 | 5.6 | 5.6 | 5.6 | 5.6 | 5.6 | 5.6 | |
| Precipitated silica A | | 70 | 70 | 70 | 70 | 70 | 70 | |
| Silane coupling agent | *4 | 5.6 | 5.6 | 5.6 | 5.6 | 5.6 | 5.6 | |
| Stearic acid | | 2 | 2 | 2 | 2 | 2 | 2 | |
| Antioxidant 6C | *5 | 1 | 1 | 1 | 1 | 1 | 1 | |
| Zinc oxide | | 3 | 3 | 3 | 3 | 3 | 3 | |
| Vulcanization accelerator NS | *6 | 1.5 | 1.5 | 1.5 | 1.5 | 1.5 | 1.5 | |
| Vulcanization accelerator CZ | *7 | 1.8 | 1.8 | 1.8 | 1.8 | 1.8 | 1.8 | |
| Sulfur | | 1.5 | 1.5 | 1.5 | 1.5 | 1.5 | 1.5 | |
| Low heat build-up | | 100 | 101 | 105 | 115 | 109 | 121 | |
| Rolling resistance | | 100 | 100 | 102 | 106 | 104 | 107 | |
| Abrasion resistance | | 100 | 101 | 102 | 104 | 103 | 108 | |

Notes:
*1: BR01 manufactured by JSR Corporation
*2: Aromax #3 manufactured by Fuji Kosan Company, Ltd.
*3: N339, Seast KH manufactured by Tokai Carbon Co., Ltd.
*4: Si75 manufactured by Degussa AG.
*5: N-(1,3-dimethylbutyl)-N'-phenyl-p-phenylenediamine
*6: N-t-butyl-2-benzothiazylsulfeneamide
*7: N-cyclohexyl-2-benzothiazolylsulfeneamide

TABLE 6 parts by weight

| | Comparative Example | | Example | | | |
|---|---|---|---|---|---|---|
| | 5 | 6 | 12 | 13 | 14 | 15 |
| Modified conjugated diene base | | | | | | |
| Polymer A | 80 | 80 | | | | |
| Polymer G | | | 80 | | | |
| Polymer H | | | | 80 | | |

TABLE 6-continued

| | | Comparative Example | Example | | | | |
|---|---|---|---|---|---|---|---|
| | | 5 | 6 | 12 | 13 | 14 | 15 |
| Polymer I | | | | | | 80 | |
| Polymer J | | | | | | | 80 |
| Styrene Butadiene rubber | *1 | 20 | 20 | 20 | 20 | 20 | 20 |
| Carbon black | *2 | 10 | 10 | 10 | 10 | 10 | 10 |
| Hydrated silica AQ | *3 | 60 | | | | | |
| Precipitated silica C | | | 60 | 60 | 60 | 60 | 60 |
| Silane coupling agent | *4 | 5 | 5 | 5 | 5 | 5 | 5 |
| Stearic acid | | 2 | 2 | 2 | 2 | 2 | 2 |
| Antioxidant 6C | *5 | 1 | 1 | 1 | 1 | 1 | 1 |
| Zinc oxide | | 3 | 3 | 3 | 3 | 3 | 3 |
| Vulcanization accelerator DPG | *6 | 1 | 1 | 1 | 1 | 1 | 1 |
| Vulcanization accelerator DM | *7 | 0.5 | 0.5 | 0.5 | 0.5 | 0.5 | 0.5 |
| Vulcanization accelerator NS | *8 | 0.5 | 0.5 | 0.5 | 0.5 | 0.5 | 0.5 |
| Sulfur | | 1.5 | 1.5 | 1.5 | 1.5 | 1.5 | 1.5 |
| Low heat build-up | | 100 | 118 | 121 | 128 | 136 | 142 |
| Rolling resistance | | 100 | 106 | 109 | 111 | 113 | 115 |
| Abrasion resistance | | 100 | 102 | 105 | 106 | 106 | 110 |

Notes:
*1: solution polymerization SBR Buna VSL5025-1 manufactured by Lanxess AG.
*2: N339, Seast KH manufactured by Tokai Carbon Co., Ltd.
*3: Nipsil AQ manufactured by Tosoh Silica Corporation
*4: Si75 manufactured by Degussa AG.
*5: N-(1,3-dimethylbutyl)-N'-phenyl-p-phenylenediamine
*6: diphenylguanidine
*7: N-t-butyl-2-benzothiazylsulfeneamide
*8: N-cyclohexyl-2-benzothiazolylsulfeneamide

TABLE 7

| | | Comparative Example | | Example | |
|---|---|---|---|---|---|
| | | 7 | 8 | 16 | 17 |
| Modified conjugated diene base | | | | | |
| Polymer A | | 70 | 70 | | |
| Polymer K | | | | 70 | |
| Polymer L | | | | | 70 |
| Natural rubber | | 30 | 30 | 30 | 30 |
| Aroma oil | *1 | 10 | 10 | 10 | 10 |
| Carbon black | *2 | 27 | 27 | 27 | 27 |
| Hydrated silica AQ | *3 | 27 | | | |
| Precipitated silica E | | | 27 | 27 | 27 |
| Silane coupling agent | *4 | 2.5 | 2.5 | 2.5 | 2.5 |
| Stearic acid | | 2 | 2 | 2 | 2 |
| Antioxidant 6C | *5 | 1 | 1 | 1 | 1 |
| Zinc oxide | | 3 | 3 | 3 | 3 |
| Vulcanization accelerator DPG | *6 | 0.5 | 0.5 | 0.5 | 0.5 |
| Vulcanization accelerator DM | *7 | 1 | 1 | 1 | 1 |
| Vulcanization accelerator NS | *8 | 1 | 1 | 1 | 0.5 |
| Sulfur | | 1.5 | 1.5 | 1.5 | 1.5 |
| Low heat build-up | | 100 | 108 | 130 | 118 |
| Rolling resistance | | 100 | 102 | 109 | 105 |
| Abrasion resistance | | 100 | 106 | 110 | 107 |

Notes:
*1: Aromax #3 manufactured by Fuji Kosan Company, Ltd.
*2: N339, Seast KH manufactured by Tokai Carbon Co., Ltd.
*3: Nipsil AQ manufactured by Tosoh Silica Corporation
*4: Si75 manufactured by Degussa AG.
*5: N-(1,3-dimethylbutyl)-N'-phenyl-p-phenylenediamine
*6: diphenylguanidine
*7: N-t-butyl-2-benzothiazylsulfeneamide
*8: N-cyclohexyl-2-benzothiazolylsulfeneamide Followings shown below can be found from the results shown in Tables 4 to 7.

The tires (Examples 1 to 17) prepared by using the rubber compositions obtained by compounding the modified conjugated diene base polymers modified by condensation with the hydrocarbyloxy compounds and the condensation accelerating agents and the structural precipitated silicas are excellent in all of a low heat build-up, rolling resistance and abrasion resistance as compared with the tires prepared in Comparative Examples 1 to 8.

INDUSTRIAL APPLICABILITY

The rubber composition used in the present invention containing the modified copolymer is excellent in interaction of the rubber component with precipitated silica and carbon black and can improve dispersibility of precipitated silica and carbon black, and it can provide a tire which is excellent in a low heat build-up, a fracture characteristic and abrasion resistance. In particular, it can effectively be put to practical use as a tread rubber of a low fuel consumption tire for passenger cars.

What is claimed is:

1. A tire prepared by using a rubber composition obtained by compounding a modified conjugated diene base polymer, into which at least one functional group selected from a hydroxysilyl group, an alkoxysilyl group, an amino group or a halogen atom is introduced, precipitated silica which is produced by a precipitation process in which an alkali silicate and a mineral acid are added to an alkali silicate aqueous solution prepared in advance, and at least one silane coupling agent selected from the group consisting of compounds represented by the following formulae (VI), (VII) and (VIII), wherein in the precipitated silica, a cetyltrimethylammonium bromide-adsorbing specific surface area (CTAB) ($m^2/g$) and the mode $A_{ac}$ in diameters (nm) of primary aggregates determined by acoustic measurement of particle size distribution satisfy equation (A) shown below, and an ignition loss, defined as mass reduction % when heated at 750° C. for 3 hours, and a heating loss, defined as mass reduction % when heated at 105° C. for 2 hours, satisfy equation (B) shown below:

$$A_{ac} \geq -0.76 \times (CTAB) + 274 \quad (A)$$

$$2.1 \leq (\text{ignition loss}) - (\text{heating loss}) \leq 3 \quad (B)$$

wherein the mode $A_{ac}$ is 1 μm or less and the CTAB is 50 to 250 $m^2/g$, compounds represented by the following formula (VI):

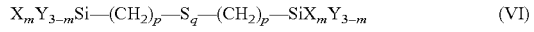

wherein X is $C_nH_{2n+1}O$ wherein n is an integer of 1 to 3 or a chlorine atom; Y is an alkyl group having 1 to 3 carbon atoms; m is an integer of 1 to 3; p is an integer of 1 to 9; q is an integer of 1 or more and may have distribution; provided that when m is 1, two Y may be same or different and that when m is 2 or 3, two or three X may be same or different, compounds represented by the following formula (VII)

wherein X is $C_nH_{2n+1}O$ wherein n is an integer of 1 to 3 or a chlorine atom; Y is an alkyl group having 1 to 3 carbon atoms; W is a mercapto group, a vinyl group, an amino group, a glycidoxy group or an epoxy group; m is an integer of 1 to 3; r is an integer of 0 to 9; provided that when m is 1, two Y may be same or different and that when m is 2 or 3, two or three X may be same or different, and compounds represented by the following formula (VIII)

$$X_mY_{3-m}Si\text{—}(CH_2)_p\text{—}S_q\text{—}Z \qquad (VIII)$$

wherein X is $C_nH_{2n+1}O$ wherein n is an integer of 1 to 3 or a chlorine atom; Y is an alkyl group having 1 to 3 carbon atoms; Z is a benzothiazolyl group, an N,N-dimethylthiocarbamoyl group or a methacryloyl group; m is an integer of 1 to 3; p is an integer of 1 to 9; q is an integer of 1 or more and may have distribution; provided that when m is 1, two Y may be same or different and that when m is 2 or 3, two or three X may be same or different.

2. The tire as described in claim 1, prepared by using the rubber composition comprising the modified conjugated diene base polymer, wherein the modified conjugated diene base polymer is obtained by subjecting a diene base monomer used alone or in combination with other monomers to anionic polymerization in a hydrocarbon solvent using an alkali metal or alkali earth metal base initiator to obtain a conjugated diene base polymer having an active site of metal and reacting the active site of the conjugated diene base polymer with a hydrocarbyloxysilane compound.

3. The tire as described in claim 1, prepared by using the rubber composition compounded with the modified conjugated diene base polymer, wherein the functional group introduced into the modified conjugated diene base polymer is introduced into a molecular end.

4. The tire as described in claim 3, prepared by using the rubber composition compounded with the modified conjugated diene base polymer, wherein the functional group introduced into the modified conjugated diene base polymer is introduced into a molecular end at a polymerization termination side.

5. The tire as described in claim 1, prepared by using the rubber composition compounded with the modified conjugated diene base polymer into which both of an alkoxysilyl group and an amino group are introduced as the functional group.

6. The tire as described in claim 1, prepared by using the rubber composition compounded with the modified conjugated diene base polymer, wherein the amino group is a protic amino group or a protected amino group.

7. The tire as described in claim 1, prepared by using the rubber composition compounded with the modified conjugated diene base polymer, wherein the amino group is a primary amino group or a protected primary amino group.

8. The tire as described in claim 1, prepared by using the rubber composition comprising the modified conjugated diene base polymer, wherein the modified conjugated diene base polymer is obtained by being subjected to condensation reaction in the presence of a condensation accelerating agent comprising a compound of at least one of elements belonging to 4th group, 12th group, 13th group, 14th group and 15th group in the periodic table.

9. The tire as described in claim 1, wherein at least one rubber selected from natural rubber and/or diene base synthetic rubber is further contained as the rubber component in the rubber composition, and 10 to 150 parts by mass of the precipitated silica based on 100 parts by mass of the whole rubber components is compounded in the rubber composition.

10. The tire as described in claim 1, wherein 1 to 20% by mass of the silane coupling agent based on a compounding amount of the precipitated silica is compounded in the rubber composition.

11. The tire as described in claim 1, wherein the rubber composition further contains 80 parts by mass or less of carbon black as a reinforcing filler based on 100 parts by mass of the rubber component, and a total compounding amount of the carbon black and the precipitated silica is 120 parts by mass or less.

* * * * *